(12) United States Patent
Katinsky et al.

(10) Patent No.: US 8,805,830 B2
(45) Date of Patent: *Aug. 12, 2014

(54) WEB APPLICATION FOR ACCESSING MEDIA STREAMS

(75) Inventors: Steve Katinsky, Los Angeles, CA (US);
Michael Burress, Venice, CA (US);
Jefferson Furtado, Galt, CA (US)

(73) Assignee: Copper Data River LLC, Las Vegas, NV (US)

( * ) Notice: Subject to any disclaimer, the term of this patent is extended or adjusted under 35 U.S.C. 154(b) by 1044 days.

This patent is subject to a terminal disclaimer.

(21) Appl. No.: 12/485,236

(22) Filed: Jun. 16, 2009

(65) Prior Publication Data
US 2009/0319925 A1    Dec. 24, 2009

Related U.S. Application Data

(60) Division of application No. 10/210,203, filed on Jul. 31, 2002, now Pat. No. 7,610,394, which is a continuation of application No. 09/187,256, filed on Nov. 6, 1998, now Pat. No. 6,452,609.

(51) Int. Cl.
*G06F 17/30*    (2006.01)

(52) U.S. Cl.
USPC ........... 707/732; 707/733; 707/734; 709/217; 709/218; 709/219; 369/30.08

(58) Field of Classification Search
CPC .......... G06F 17/3005; G06F 17/30029; G06F 17/30026; G06F 17/30023; G06F 17/30053; G06F 17/30755; G06F 17/30761; G06F 17/30769; G06F 17/30772
See application file for complete search history.

(56) References Cited

U.S. PATENT DOCUMENTS

| 5,353,401 | A |   | 10/1994 | Iizawa et al. |
|---|---|---|---|---|
| 5,668,788 | A |   | 9/1997 | Allison |
| 5,724,595 | A |   | 3/1998 | Genter |
| 5,774,670 | A | * | 6/1998 | Montulli ................. 709/227 |
| 5,793,366 | A |   | 8/1998 | Mano et al. |
| 5,793,980 | A | * | 8/1998 | Glaser et al. ............ 709/231 |
| 5,796,945 | A |   | 8/1998 | Tarabella |
| 5,796,952 | A | * | 8/1998 | Davis et al. ............. 709/224 |

(Continued)

FOREIGN PATENT DOCUMENTS

| EP | 0831608 A2 * | 3/1998 | ............ H04H 1/00 |
|---|---|---|---|
| WO | WO 00/28396 | 5/1999 | |

OTHER PUBLICATIONS

"Dynamic argument embedding: preserving state on the World Wide Web," by Iyengar, A. In: Internet Computing, IEEE (1997). Available at: IEEE Xplore.*

(Continued)

*Primary Examiner* — Daniel Kinsaul
(74) *Attorney, Agent, or Firm* — Amin, Turocy & Watson, LLP

(57) ABSTRACT

A web page has a player for playing media objects, a sequencer which displays a playlist that defines an order in which media objects are played by the player, and a media access area for containing a plurality of graphical icons. Each graphical icon representing a media object, and the graphical icons can be manipulated by a user to modify the play list. For example, the media icons may be dragged to the sequencer to add them to the sequencer.

20 Claims, 19 Drawing Sheets

(56) References Cited

U.S. PATENT DOCUMENTS

| | | | |
|---|---|---|---|
| 5,864,868 A | 1/1999 | Contois | |
| 5,872,747 A | 2/1999 | Johnson | |
| 5,892,915 A * | 4/1999 | Duso et al. | 709/219 |
| 5,905,983 A | 5/1999 | Inomata et al. | |
| 5,918,213 A | 6/1999 | Bernard et al. | |
| 5,953,005 A | 9/1999 | Liu | |
| 5,969,283 A | 10/1999 | Looney et al. | |
| 5,986,979 A | 11/1999 | Bickford et al. | |
| 6,005,563 A | 12/1999 | White et al. | |
| 6,018,768 A | 1/2000 | Ullman et al. | |
| 6,025,841 A | 2/2000 | Finklestein et al. | |
| 6,133,913 A | 10/2000 | White et al. | |
| 6,141,010 A | 10/2000 | Hoyle | |
| 6,154,771 A * | 11/2000 | Rangan et al. | 709/217 |
| 6,169,997 B1 | 1/2001 | Papierniak et al. | |
| 6,173,317 B1 | 1/2001 | Chaddha et al. | |
| 6,201,996 B1 * | 3/2001 | Crater et al. | 700/9 |
| 6,202,155 B1 | 3/2001 | Tushie et al. | |
| 6,226,618 B1 | 5/2001 | Downs et al. | |
| 6,230,200 B1 | 5/2001 | Forecast et al. | |
| 6,243,328 B1 | 6/2001 | Fenner et al. | |
| 6,243,725 B1 * | 6/2001 | Hempleman et al. | 715/210 |
| 6,249,795 B1 * | 6/2001 | Douglis | 715/210 |
| 6,262,723 B1 | 7/2001 | Matsuzawa et al. | |
| 6,314,094 B1 * | 11/2001 | Boys | 370/352 |
| 6,346,951 B1 | 2/2002 | Mastronardi | |
| 6,385,596 B1 | 5/2002 | Wiser et al. | |
| 6,441,832 B1 | 8/2002 | Tao et al. | |
| 6,452,609 B1 | 9/2002 | Katinsky et al. | |
| 6,516,323 B1 | 2/2003 | Kamba | |
| 6,519,584 B1 | 2/2003 | Tognazzini et al. | |
| 6,587,127 B1 | 7/2003 | Leeke et al. | |
| 6,622,171 B2 | 9/2003 | Gupta et al. | |
| 6,714,931 B1 * | 3/2004 | Papierniak et al. | 1/1 |
| 6,748,427 B2 | 6/2004 | Drosset et al. | |
| 7,610,394 B2 | 10/2009 | Katinsky et al. | |
| 2003/0137531 A1 | 7/2003 | Katinsky et al. | |
| 2006/0288111 A1 | 12/2006 | Katinsky et al. | |

OTHER PUBLICATIONS

"Winamp Version 1," screenshots of Winamp v1.00 (release date: Jun. 7, 1997). Available at: www.oldversion.com.*

"Java Applications and Implementations," by Steele, Guy. In: Worlwide Computing and its Applications—WWCA'98 (Mar. 4-5, 1998). Available at: SpringerLink.*

OA mailed Sep. 22, 2004 for U.S. Appl. No. 10/210,203, 24 pages.
OA mailed Jun. 8, 2005 for U.S. Appl. No. 10/210,203, 25 pages.
OA mailed Jul. 13, 2006 for U.S. Appl. No. 10/210,203, 24 pages.
OA mailed Oct. 2, 2008 for U.S. Appl. No. 10/210,203, 22 pages.
OA dated Dec. 9, 2010 for U.S. Appl. No. 11/514,018, 28 pages.
OA dated Jun. 23, 2010 for U.S. Appl. No. 11/514,018, 20 pages.
OA dated Sep. 17, 2012 for U.S. Appl. No. 11/514,018, 36 pages.
Anonymous, "DHTML tool war begins," *Web Techniques*, Feb. 1998, 3(2), 7 pages.
Bouthillier, "Sychronized W3C Format Is All Smiles," wysiwyg://11/http://www.webtechniques.com/archives/1998/09/bouthillier, Sep. 1998, 1-13 and attached.
"MIDI Made Music Jukebox v6.2," http://www.hitsquad.com/smm/programs/MIDI_Made_Music_Jukebox/, Jan. 22, 1997, 1-3 and attached.
Russell, "Welcome to the Voltage Circuit Simulator (with Java source code)," http://www.javasoft.com/applets/archive/beta/Voltage/index.html; http://www.javasoft.com/applets/archive/beta/Voltage/voltage/voltage.java, Sep. 1995, 1-2; 1-12.
"Sun Delivers Rich Set of Java Media and Communication AIP's," *Java*, http://www.java.sun.com/pr/1997/august/pr970806-01.html, Aug. 1997, 4 pages.
Hiang, "Interesting Features in WinAmp," Jun. 23, 1997, New Straits Times, p. 51.
Winamp, "Winamp Player New Features," from http://web.archive.org/web/19981202191016/winamp.com/winamp/newfeatures/html, pp. 1-4 of printout, (1998).
Winamp, "Winamp Player Overview," from http://web.archive.org/web/19981207050153/winamp.com/winamp/overview.html, pp. 1-3 of printout, (1998).
Wenham, "Mod Players for OS/2," 1996, OS/2 e-Zine!, from www.os2ezine.com/v1n14/modplyrs.htm, pp. 1-5 as printed.
Haligonian Media, "OS/2 e-Zine!, vol. 1, No. 14" 1996, from www.os2site.com/sw/magazine/ezine/other/dec96.txt, pp. 1-39 as printed.
RealNetworks, Inc., "RealFlash and RealAudio Content Creation Guide, Beta 5.0," 1997, RealNetworks, from docs.real.com/docs.flshccg.pdf, pp. 1-20 as printed.
RealNetworks, Inc., User Guide for RealPlayer Plus 5.0, 1997, RealNetworks, Inc., pp. 1-62.
International Search Report mailed May 23, 2000 in PCT/US99/26258.

* cited by examiner

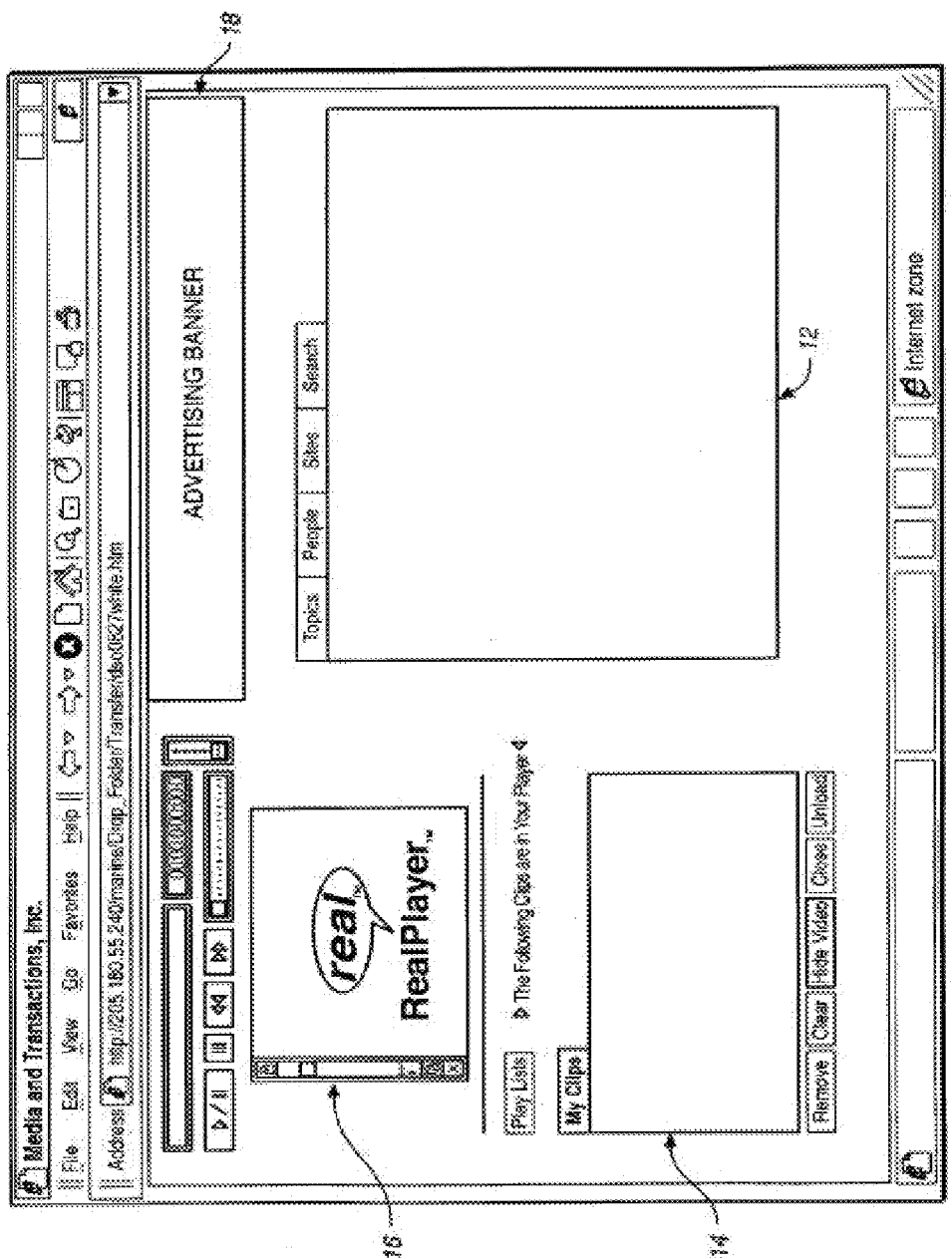
FIG._1

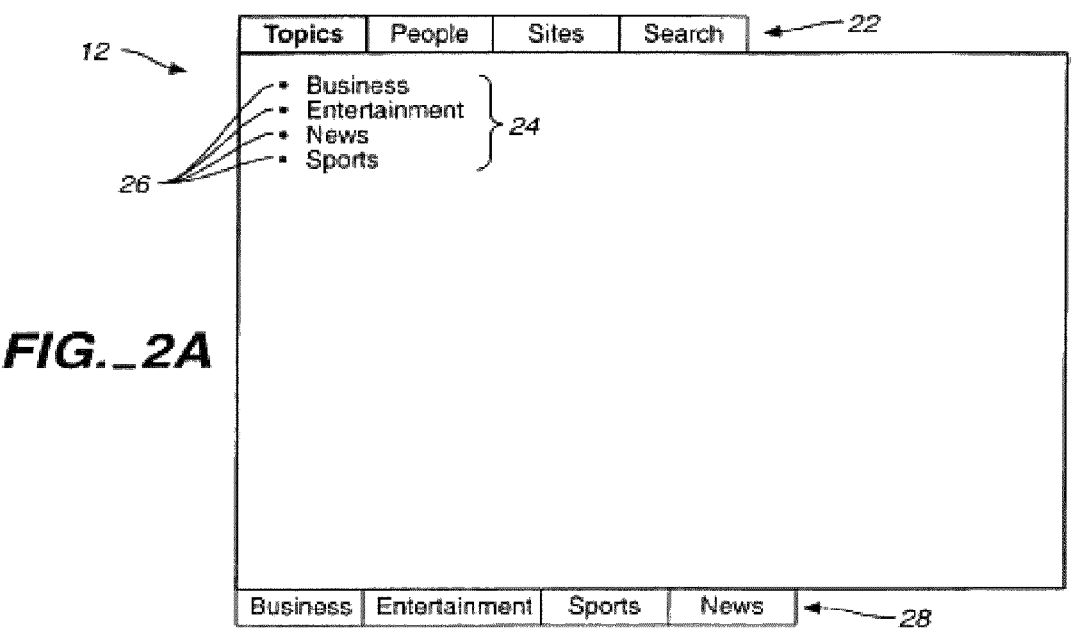
FIG._2A
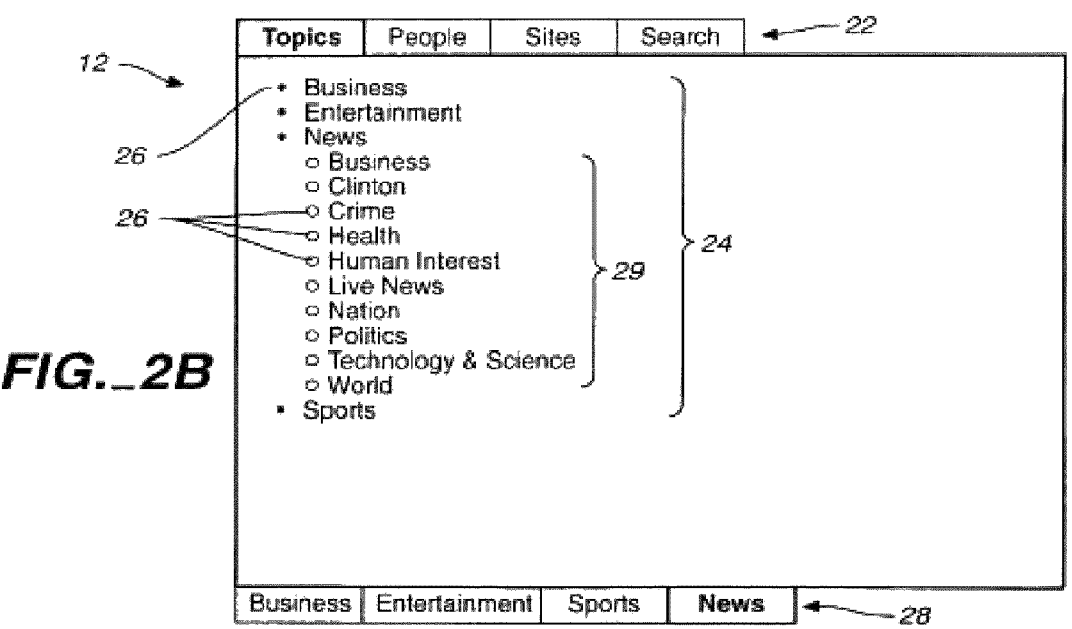
FIG._2B

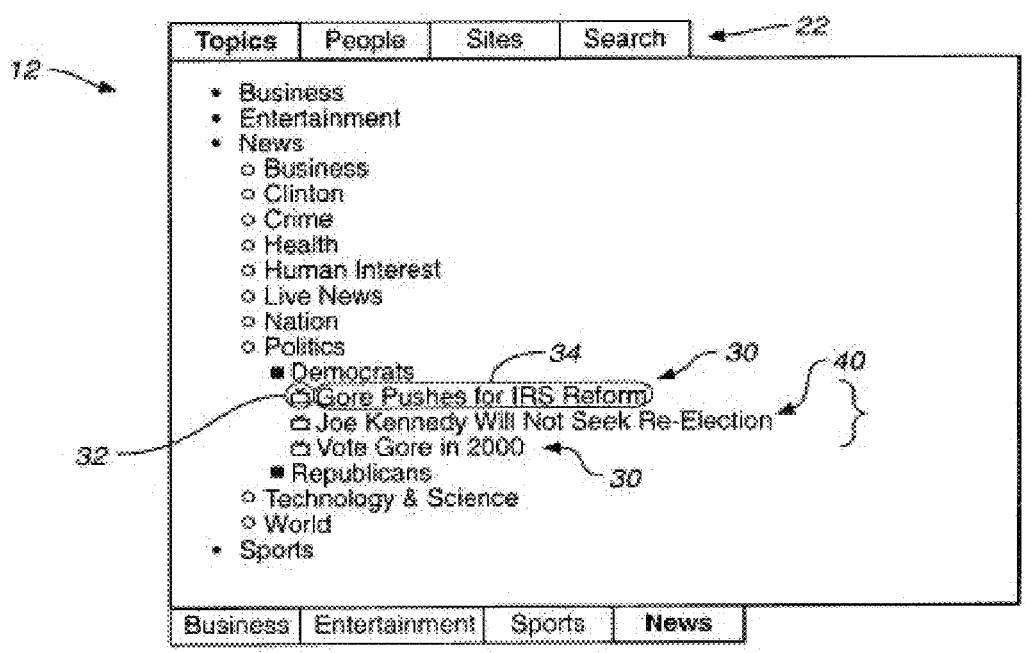
FIG._2C

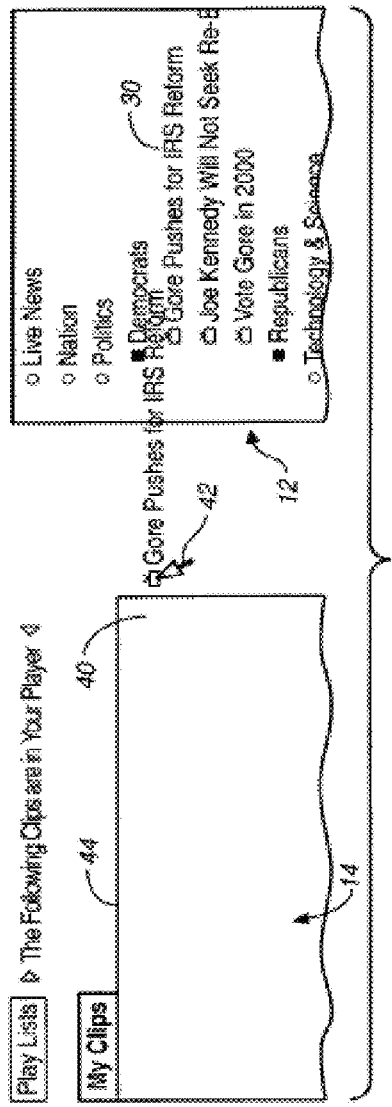
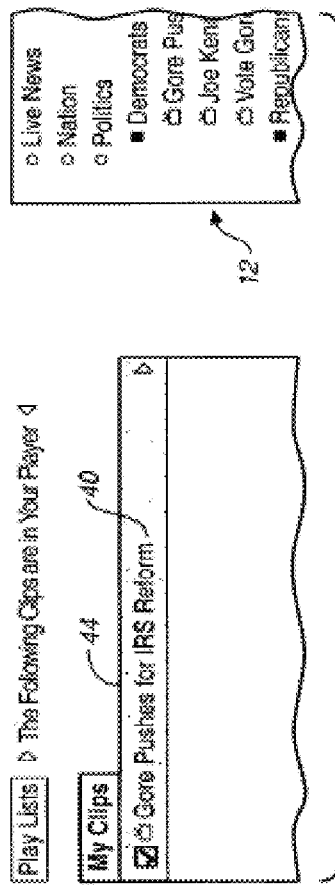
FIG._3A
FIG._3B

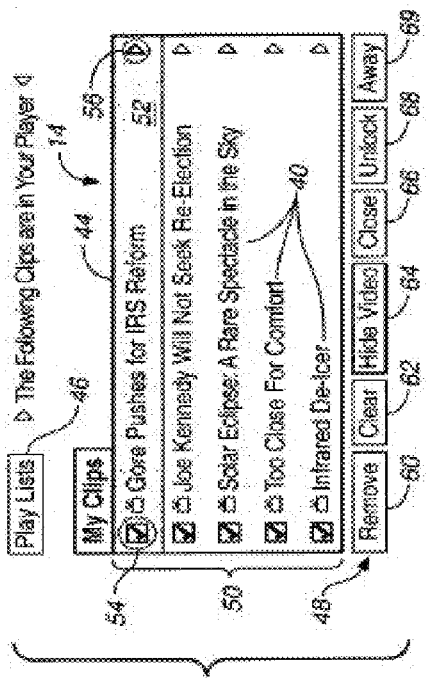
FIG._4
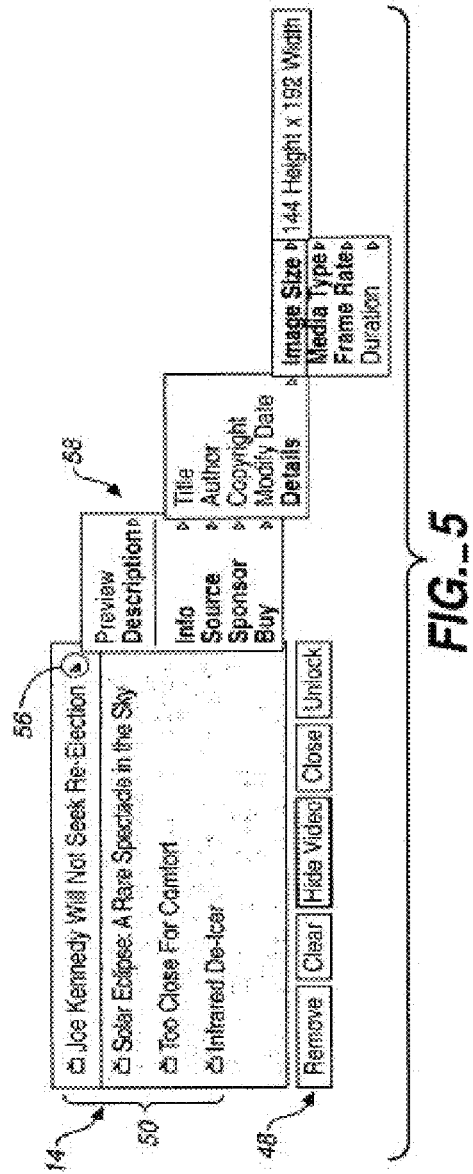
FIG._5

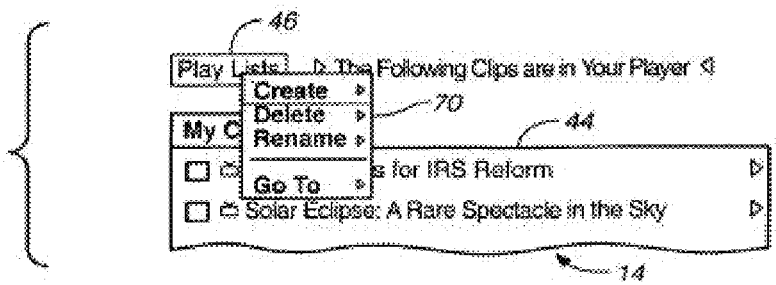
FIG._6A
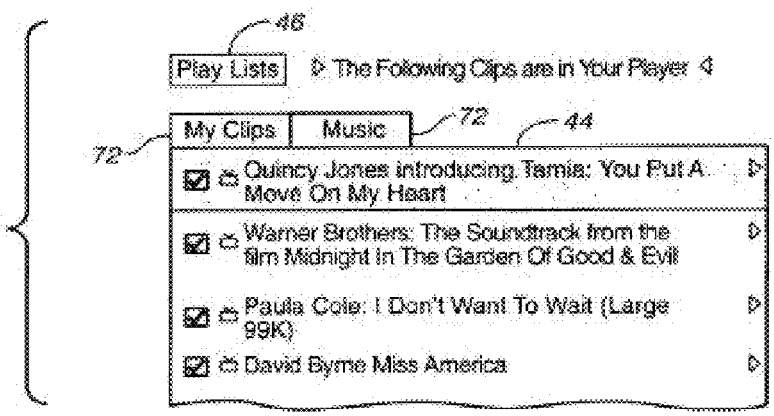
FIG._6B
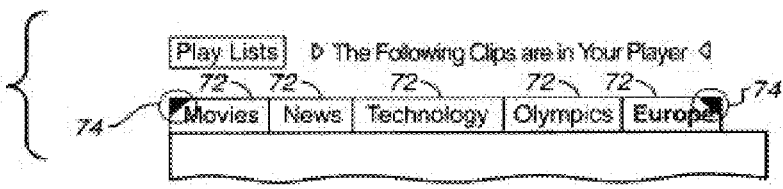
FIG._6C
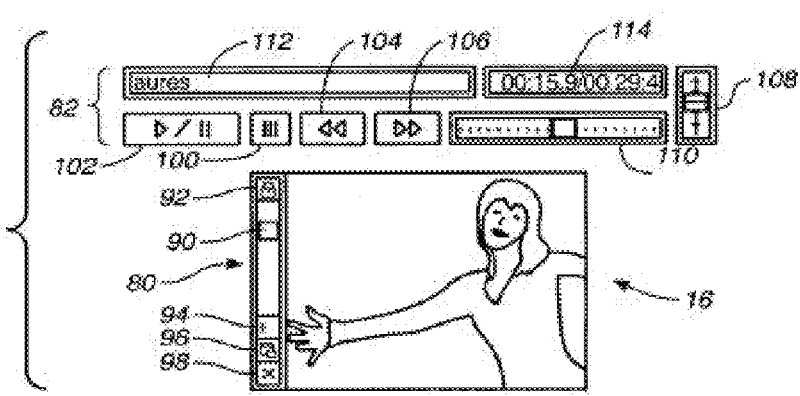
FIG._7

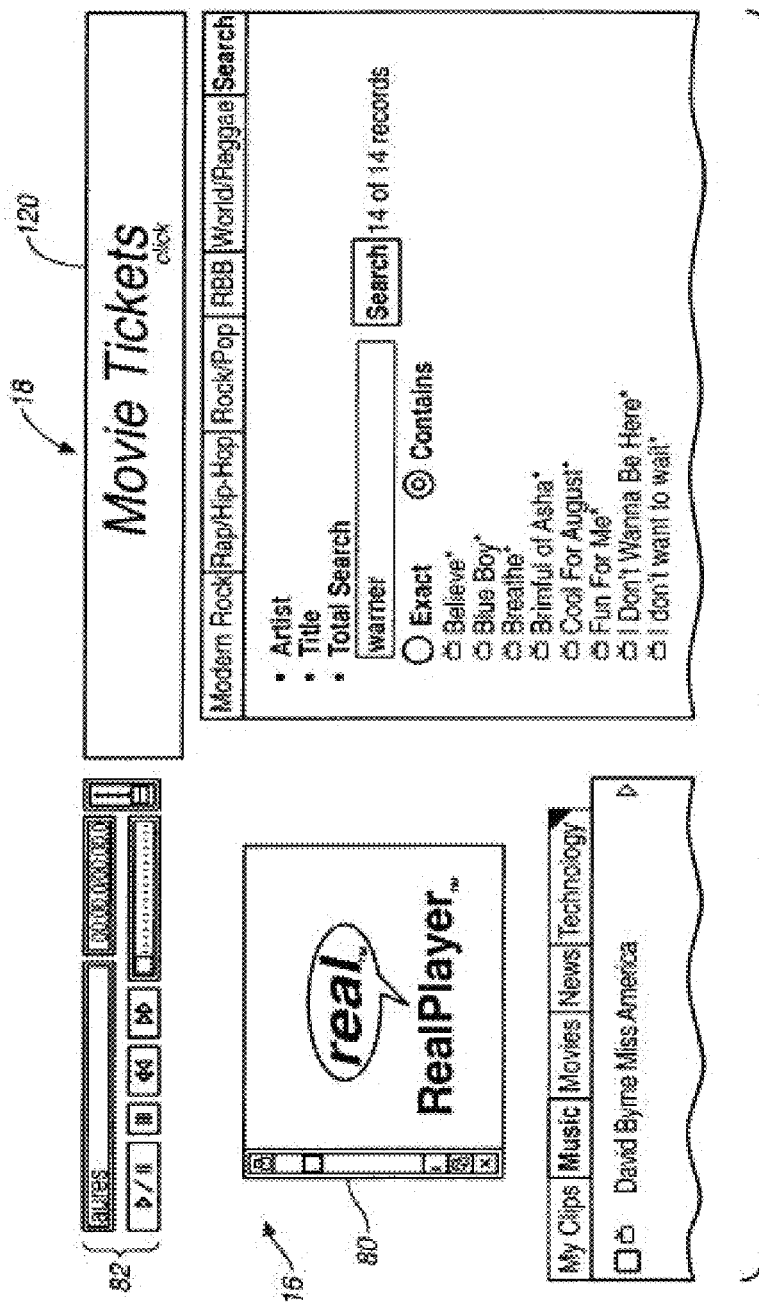
FIG._8A

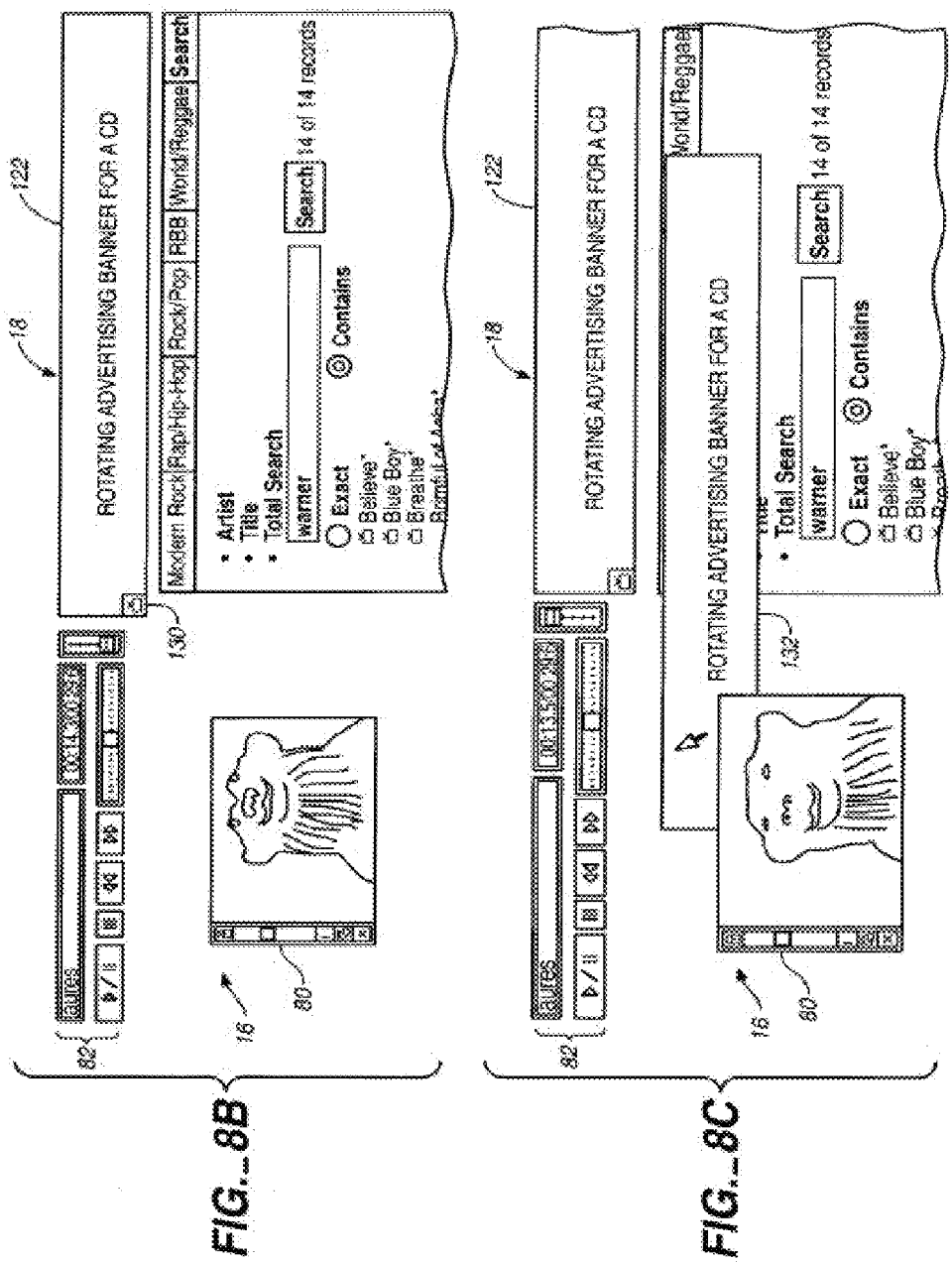

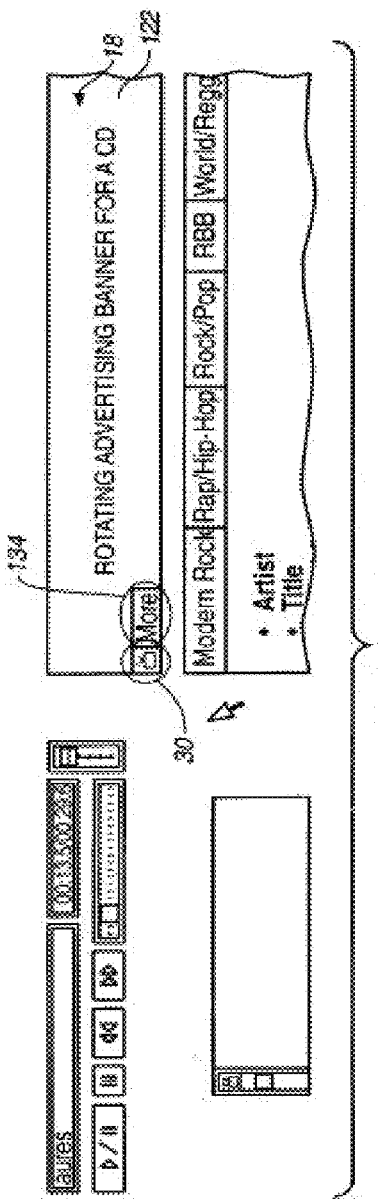
FIG._9A
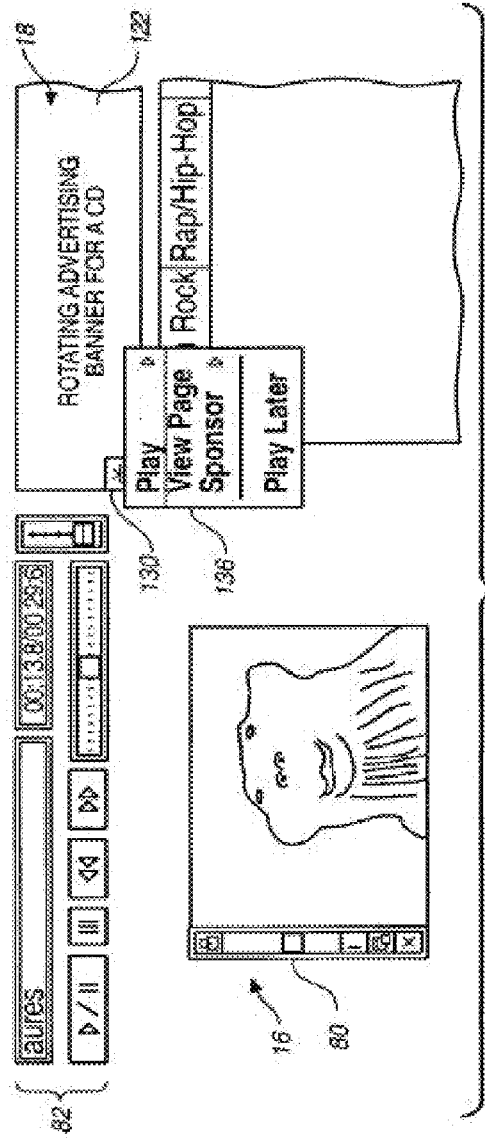
FIG._9C

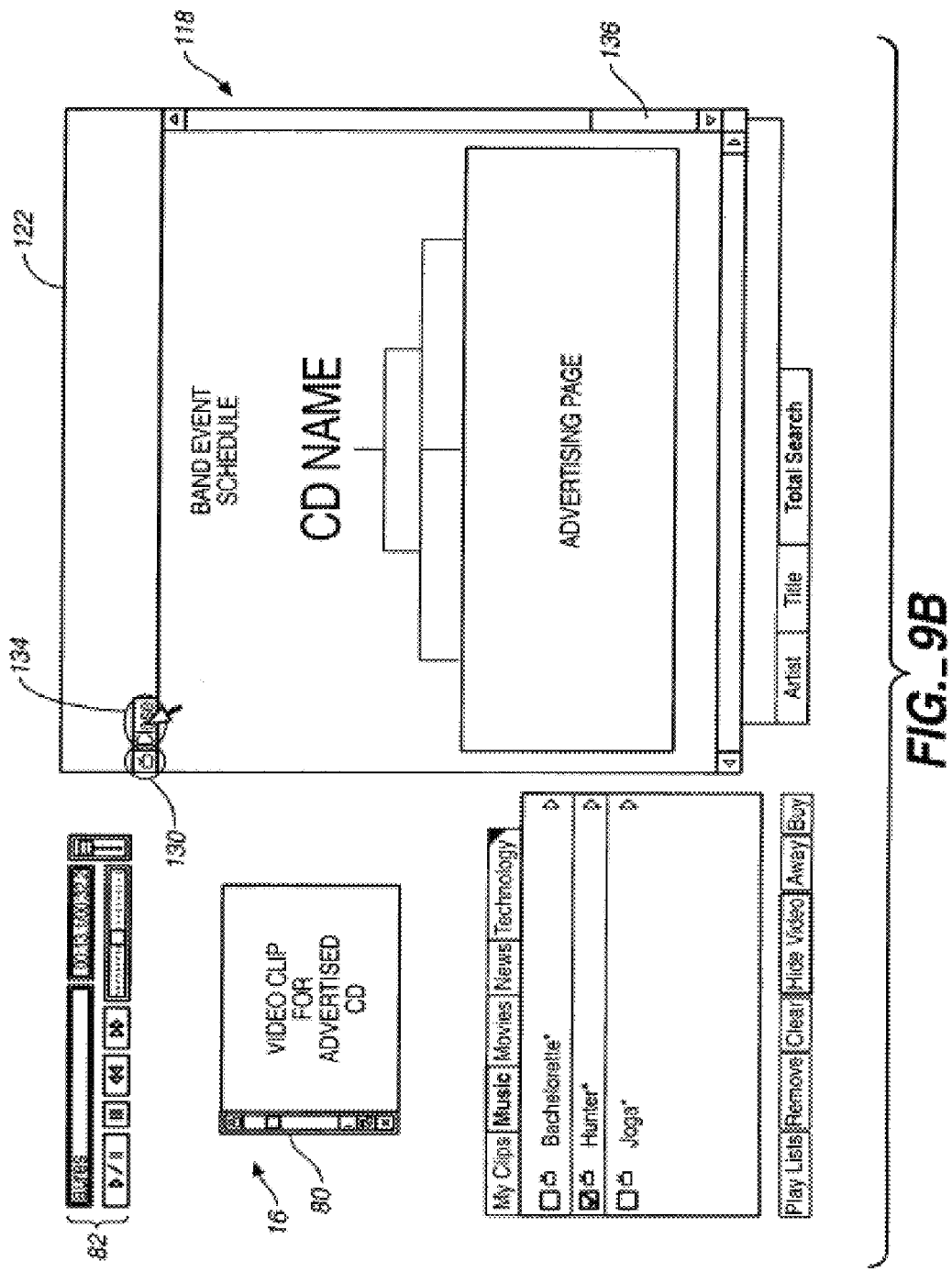
FIG._9B

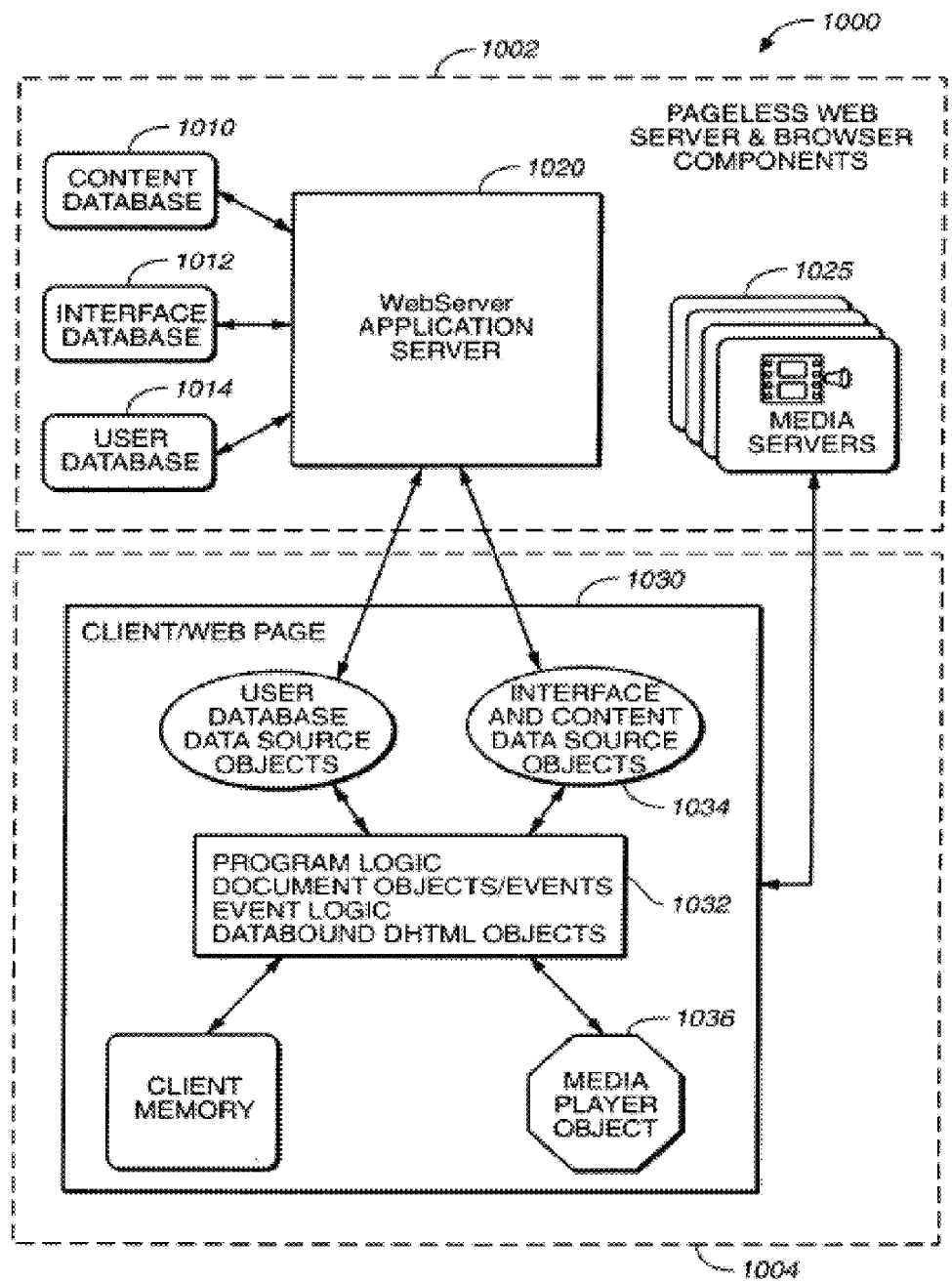
FIG._10

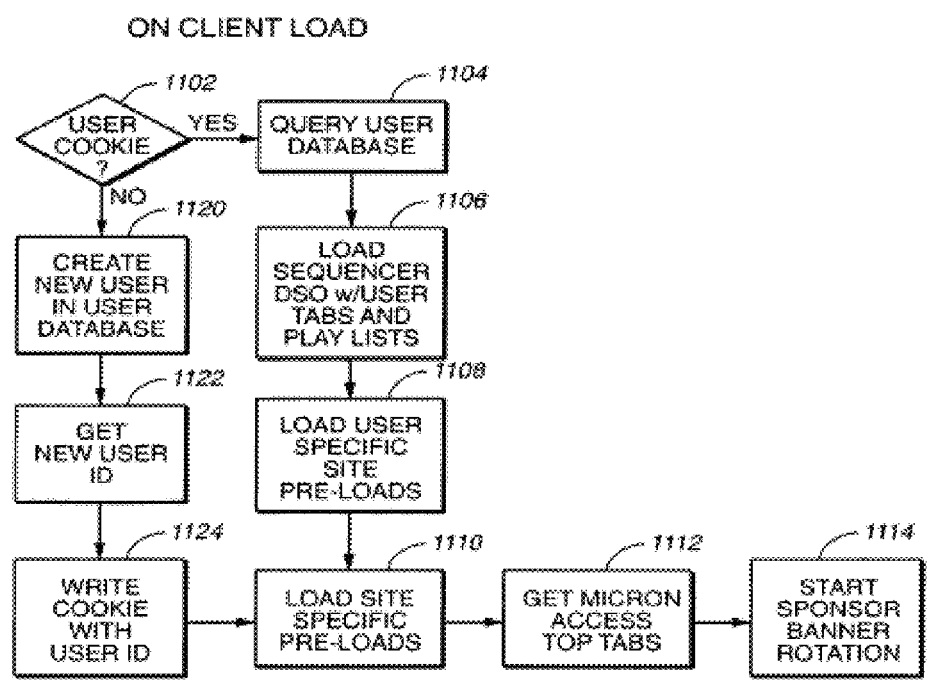
FIG._11

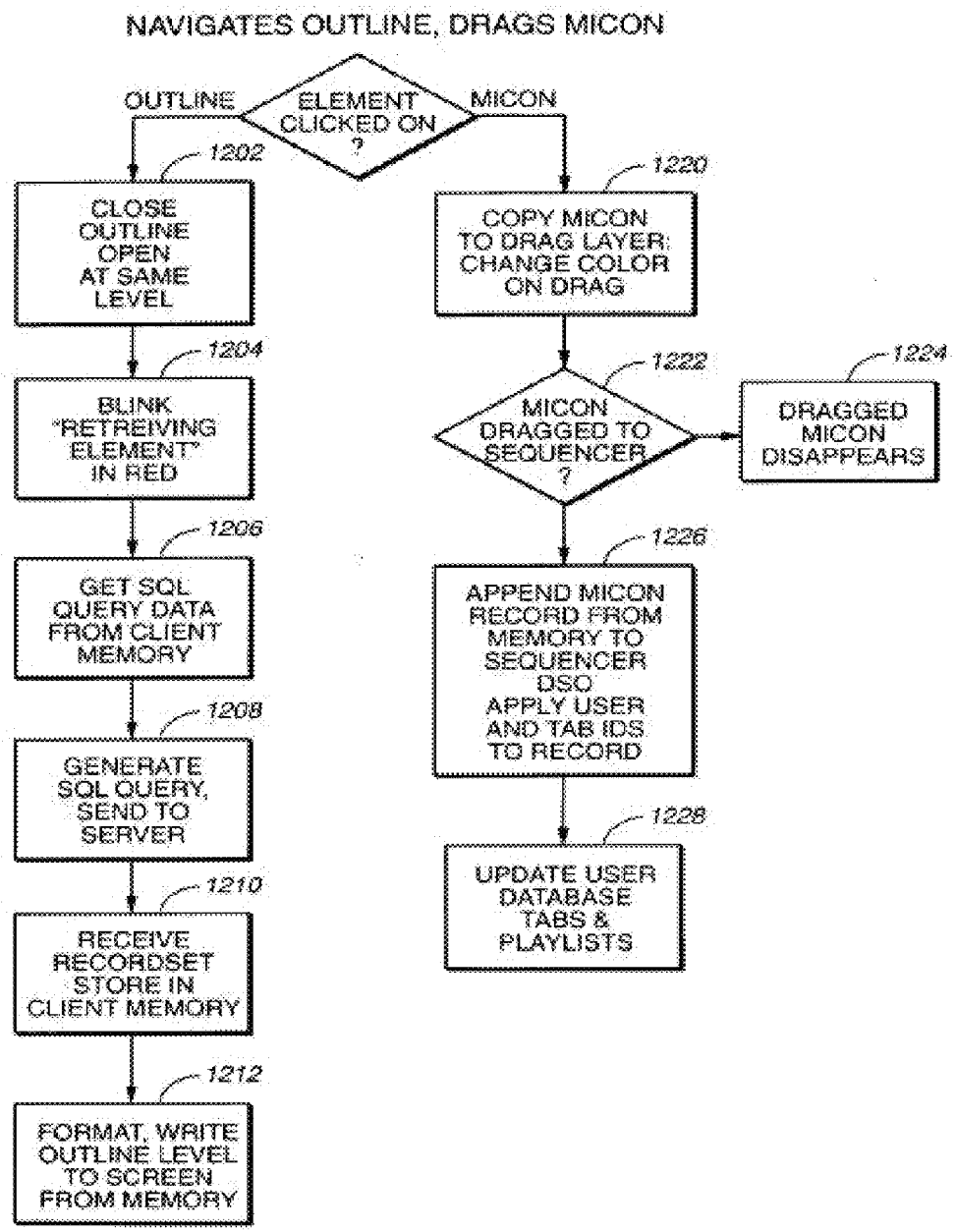
FIG._12

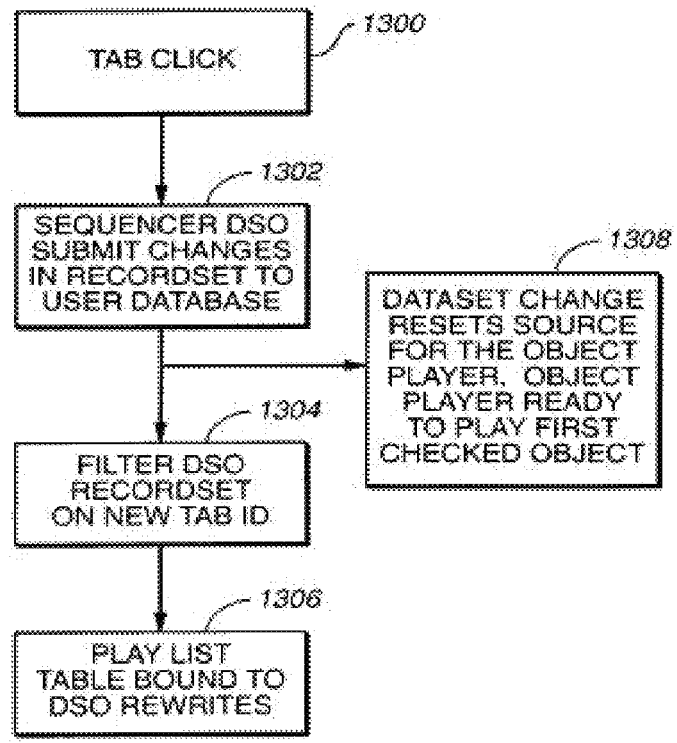
FIG._13A
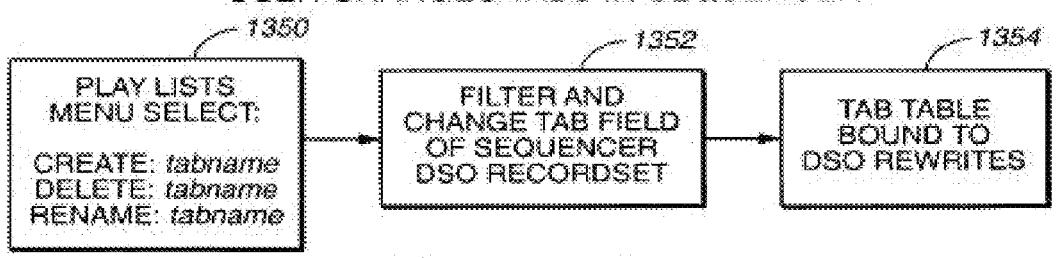
FIG._13B

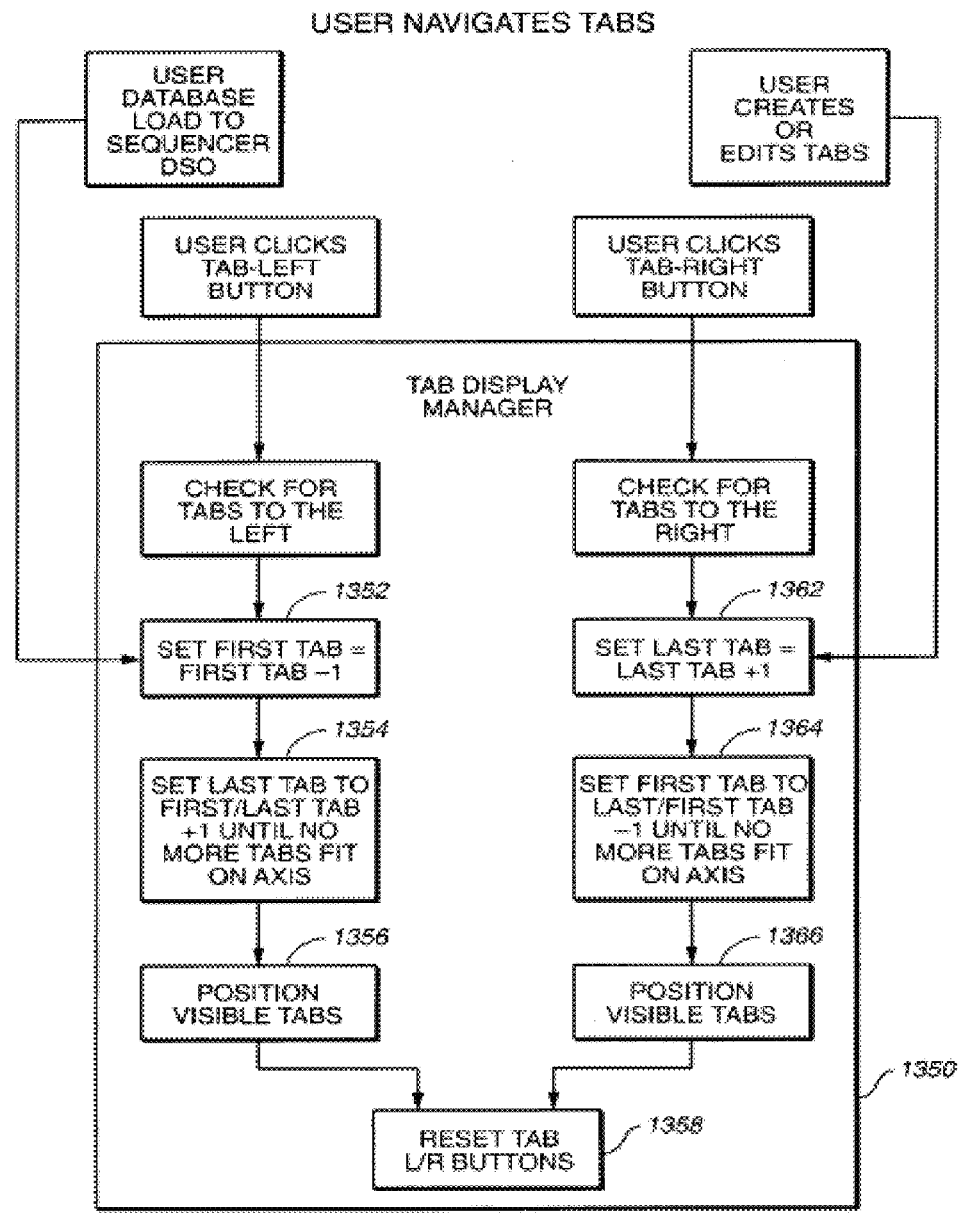
FIG._13C

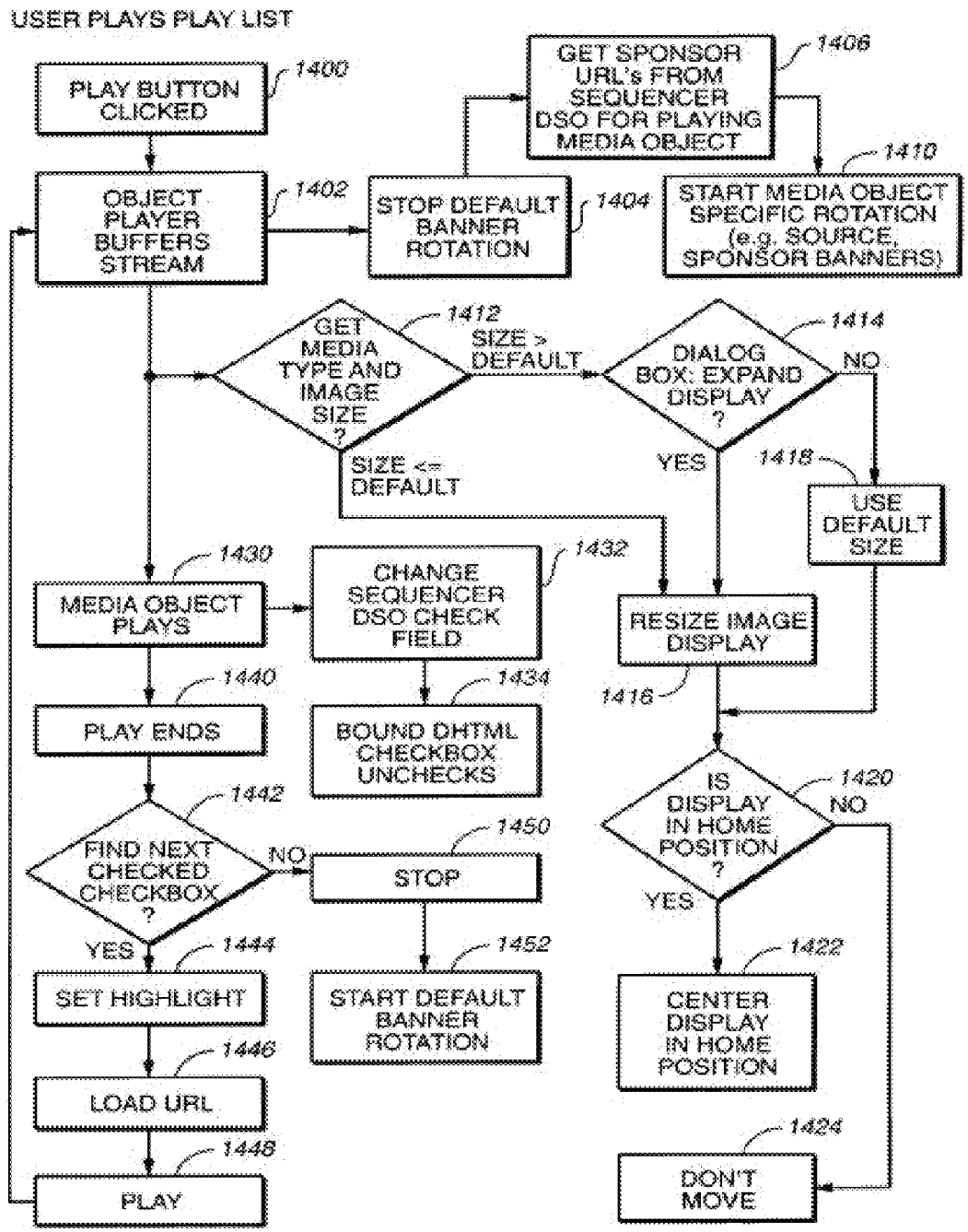
FIG._14

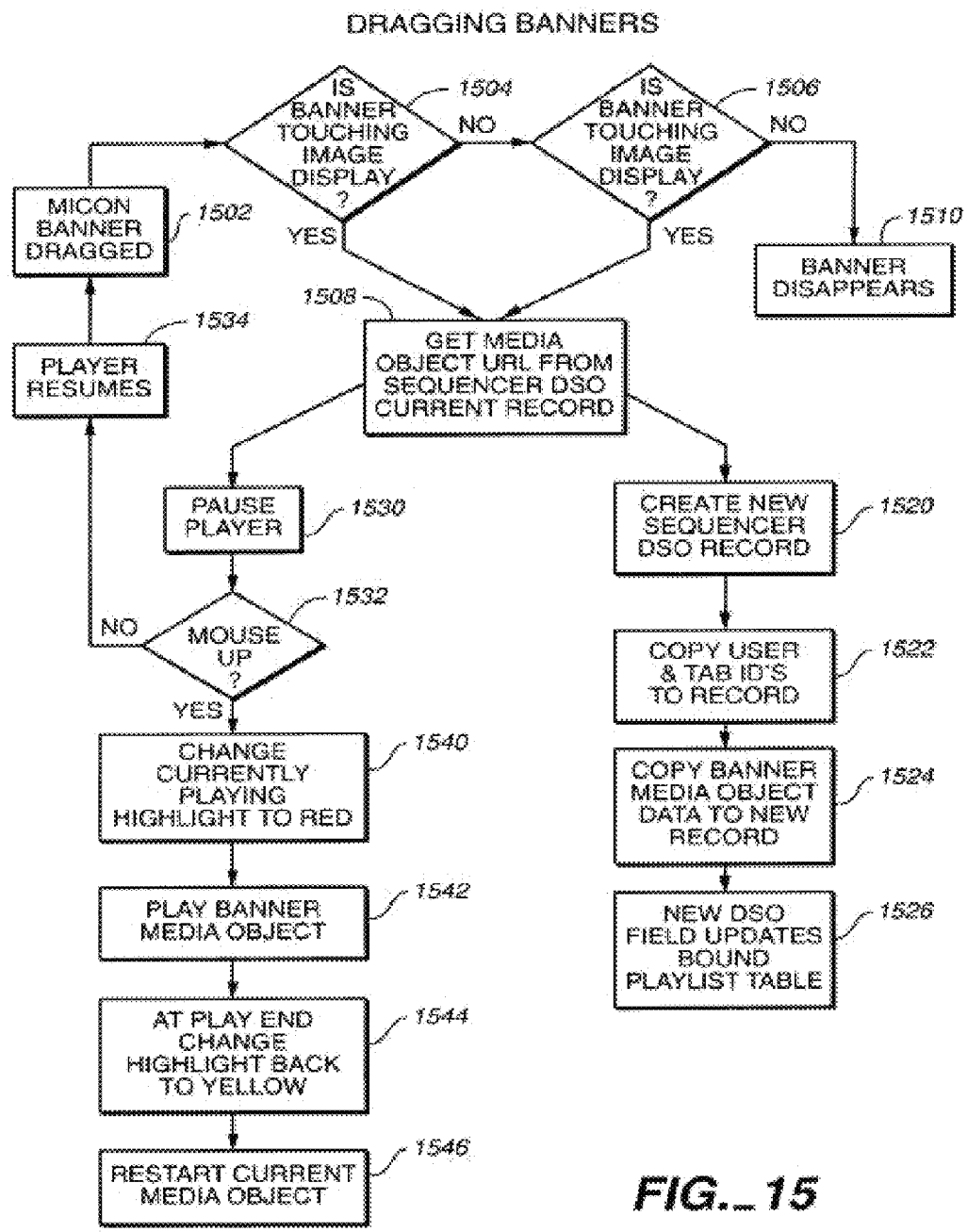
FIG._15

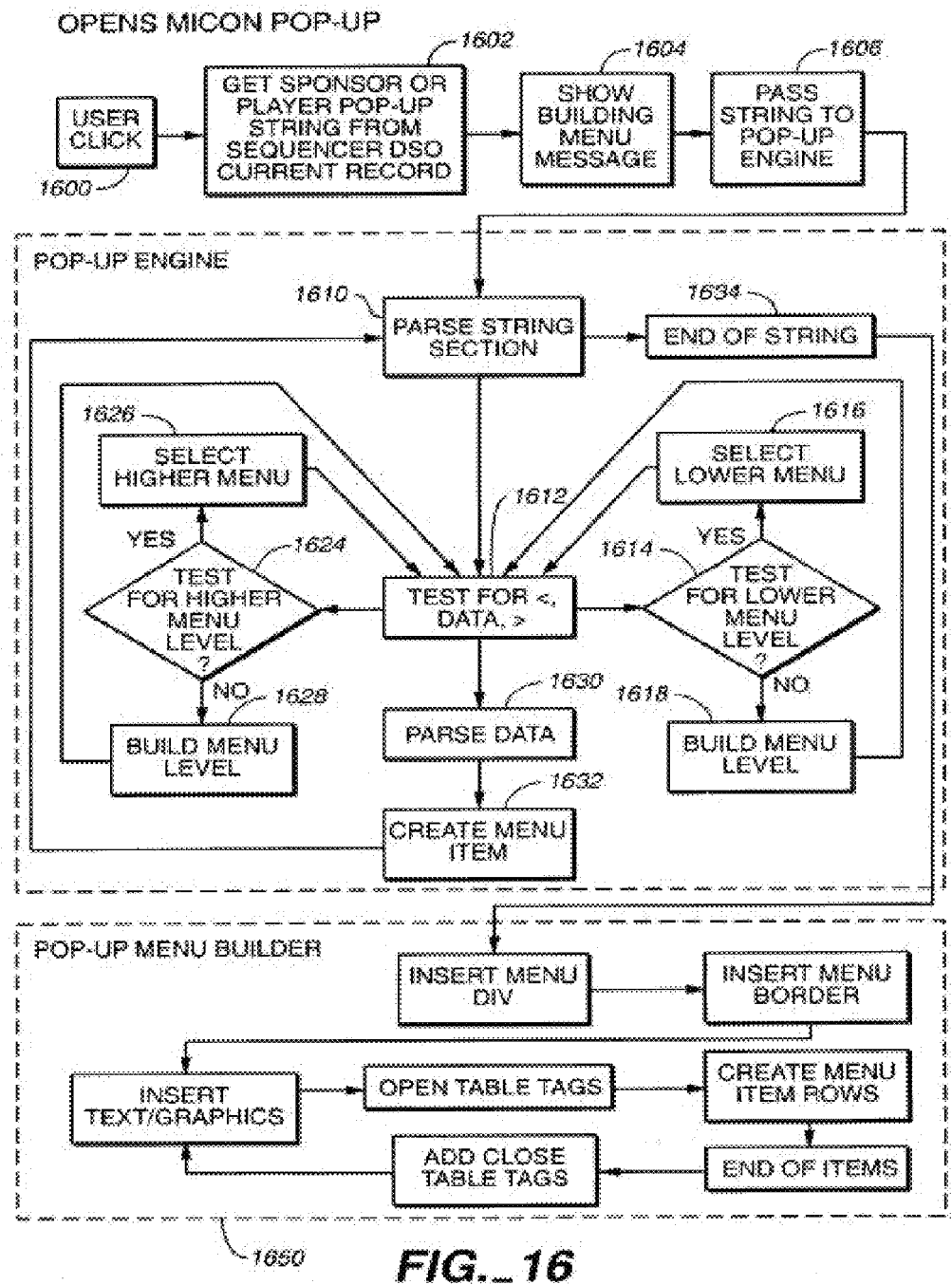
FIG._16

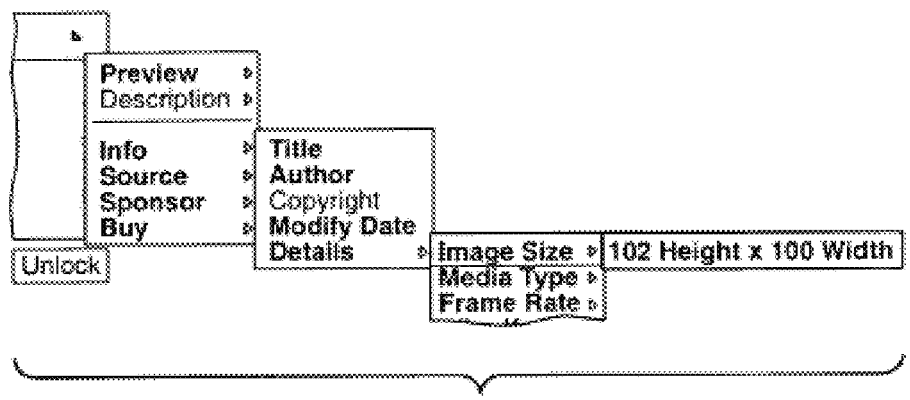
FIG._17

WEB APPLICATION FOR ACCESSING MEDIA STREAMS

CROSS-REFERENCE

This application is a divisional of U.S. patent application Ser. No. 10/210,203, filed Jul. 31, 2002, which is a continuation of U.S. application Ser. No. 09/187,256, filed Nov. 6, 1998, now U.S. Pat. No. 6,452,609, incorporated herein by reference in their entireties.

BACKGROUND

The present application relates generally to providing media streams from Internet sites.

The World Wide Web (WWW) is conventionally conceived as a system in which a user navigates between text documents on different servers by means of hypertext links. Activating a hypertext link causes another page, also composed of text and links, to be delivered to the client computer. Thus, on the WWW, a user's experience is determined by the order in which the user clicks on links.

In general, non-text objects are treated as illustrations placed on text pages. Although WWW standards include an open ended specification for handling multimedia files that allows media objects to be referenced by hypertext links, those references are treated no differently than hypertext links to pages and illustrations. Typically, three techniques are used to access multimedia files. First, a link can point to a special media file that requires a special player program to produce the images and sounds of the media file. Second, the link can point to a player program that starts independently of the web browser to play the media file. The interface provided by the player program controls the media file. Third, the link can point to a player program embedded in the page. In this case, the user can click on the link to choose which media file to play without leaving the page. However, the size of the image displayed and the controls available to the user are chosen by the web page designer.

The currently available tools that can be used to synchronize the presentation of multimedia components include proprietary languages, such as Macromedia's Lingo and Apple's Hypercard, and scripting languages, such as ECMAScript (JavaScript). In recognition of the difficulty of multimedia authoring with the currently available tools, the World Wide Web Consortium (W3C) has proposed a new language called the Synchronized Multimedia Integration Language (SMIL).

The WWW was developed for utility in the assembly and cross referencing of text content documents with user freedom in navigation. On the other hand, multimedia development has focused on interactive but canned content with limited use options that are defined by the author. Thus, multimedia on the web has been subject to conflicting developmental pressures, and has not developed a coherent presentation format.

SUMMARY

In one aspect, the invention is directed to a web page with a player for playing media objects, a sequencer which displays a play list that defines an order in which media objects are played by the player, a media access area for containing a plurality of graphical icons. Each graphical icon representing a media object, and the graphical icons can be manipulated by a user to modify the play list.

Implementations of the invention may include the following features. The graphical icon includes an indication of a media type of the media object and text describing content of the graphical object. A graphical icon can be dragged from the media access area to the sequencer to add the media object represented by the graphical icon to the play list. The sequencer can display one of multiple play lists, and the user may switch between play lists by selecting a tab associated with the play list. For each graphic object in the play list, the play list box may contain a copy of the graphical icons representing the graphical object, a checkbox to control whether the player will play the graphic object, and a pop-up menu to provide information about the graphic object. The sequencer and media access area may be implemented with scripted DHTML. The media access area may include an expandable and collapsible outline of subjects, and the media icons may be arranged in lists in the outline. The media access area may include a tab for each subject at a top level of the outline, and the user can switch between subjects by selecting a one of the tabs. The media access area may display one of a plurality of outlines, and the user can switch between outlines by selecting a tab. The player may include a control panel and a draggable image display window. The image display window may include a home button to return the image display window to a home position on the web page, an image area, a handle, a button to hide the image area, and a size lock button to prevent the image display window from expanding beyond a default size. The web page may further include a site-driven area to display a banner. The banner may be synchronized with the media object being played by the player, and a media object may be associated with the banner. The user may change the play list to play the media object associated with the banner by manipulating the banner. Dragging the banner to the sequencer may add the media object associated with the banner to the play list, and dragging the banner to the image area of the player may play the media object associated with the banner. The banner may include a pop-up menu to display information about the media object associated with the banner.

In another aspect, the invention is directed to a method of operating a web page. Multiple sources of streaming content are displayed to a user, and user input is received to select a playing order for the sources of streaming content. The playing order is stored, user input is received to start delivering the streaming content to the user, and the streaming content is presented to the user in the stored order.

In another aspect, the invention is directed to an Internet site having a first database to store information about a plurality of media objects, a second database to store information about how the media objects are to be presented on a web page, a third database to store information about a plurality of users, and an application server for communicating with a client running the web page.

Advantages of the invention may include one or more of the following. The user can locate and control streams of multimedia content in real time without accessing different web pages or surrendering control to a media player program. A user can define and assemble multiple sequences of media objects, particularly sources of streaming content. The user can manage a persistent personal collection of media objects from a network client. The user can gather additional streaming content while a media object is playing, and can modify and create sequences while a media object is playing. The user can add and remove media objects from a sequence, can deselect media objects to prevent them from playing without removing them from a sequence, and can switch between different user defined sequences. New media objects can be preloaded into a sequence based on a personal preference or interest profile defined by the user. Individual user histories (as defined by the order in which a user adds media objects to sequences and plays the media Objects) can be used to generate an outline organized by user-defined tabs and dates. Users can exchange play lists and player combinations by electronic mail.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 illustrates a media access web page according to the present invention.

FIGS. 2A, 2B and 2C illustrate the use of a media icon access panel from the web page of FIG. 1.

FIGS. 3A and 3B illustrate the step of dragging a media icon from the access panel to a sequencer from the web page of FIG. 1.

FIG. 4 illustrates the sequencer containing several media icons.

FIG. 5 illustrates the use of a media object pop-up menu.

FIGS. 6A, 6B and 6C illustrate the manipulation of multiple play lists by the sequencer.

FIG. 7 illustrates the object player from the web page of FIG. 1.

FIGS. 8A, 8B, 8C and 9A, 9B, 9C illustrate the operation of the site-driven area from the Internet site of FIG. 1.

FIG. 10 illustrates a pageless Internet site for generating a media access web page.

FIG. 11 illustrates a method performed when a user contacts a media access web page server.

FIG. 12 illustrates a method performed when a user interacts with the media icon access panel.

FIGS. 13A, 13B, and 13C illustrate methods performed when a user switches or changes tabs in the sequencer.

FIG. 14 illustrates a method performed when a user plays a media object from a play list 20 in the sequencer.

FIG. 15 illustrates a method performed when a user drags a banner from the site-driven area.

FIG. 16 illustrates a method performed when a user activates a media icon pop-up menu.

FIG. 17 illustrates a media icon pop-up menu.

DETAILED DESCRIPTION OF ILLUSTRATIVE EMBODIMENTS

FIG. 1 shows a media access web page 10 generated by an Internet site that is particularly suited for accessing multimedia streams. The Internet site is "sequence-oriented", i.e., the user controls the sequence in which multimedia streams are presented. In addition, the Internet site is "pageless", in that media streams are delivered to the user without the user having to navigate to different pages. The media streams may be a variety of media types, such as text, audio, images, animation, video, executable code, or any combination of media types. The Internet site is a media-type neutral system, i.e., it treats different media types, such as audio and video, in a similar fashion.

The building blocks of the Internet site include playable media content units, called "media objects", and graphical representations, of the media content units called "media icons". The user manipulates the media icons to create an individual sequence, i-e., a play list, of media objects. The web page 10 presents the media icons with text and/or graphics to assist the user in determining how to manipulate the media icons.

The pageless Internet site is an inversion of conventional web site design. In conventional web site design the media object is the last link in a long chain of pages and links. The setting, context, meaning, and relevance of the media object are established in hypertext, and the media object is an adornment for the hypertext. In contrast, in the pageless Internet site, the media object is the starting point. The pageless Internet site is media-oriented, as opposed to being text-oriented with media annotations. In short, the principle of organization of web page 10 is the relationship between media objects, rather than the relationship between pages.

As shown in FIG. 1, the media access web page 10 has four functional areas, including a media icon access panel 12, a sequencer 14, an object player 16, and a site-driven area 18. The media icon access panel 12 organizes media icons into a hierarchical outline or list, and supports searches for media objects. The sequencer 14 allows the user to select media icons from the media icon access panel 12, and to create and modify one or more user defined play lists. The object player 16 plays the media objects in the order defined by the play list. In addition, the object player 16 can control the play list and the individual media objects in the play list. The site-driven area 18 presents site-driven graphics synchronized with streaming content that responds to user actions and user selected content. The graphics can also be media icons representing more media objects. The web page 10 can be implemented with JavaScript and HTML 4.0, and can be accessed with a web browser, such as Microsoft Internet Explorer 4.0. Each of the components of the web page 10 will be described in greater detail below.

The media icon access panel 12 has a series of subject matter tabs 22 arranged along an edge of the panel. To begin browsing the content of the site, the user selects one of the subject matter tabs 22, for example, by clicking on it with a mouse controlled cursor. As shown in FIG. 2A, clicking on a subject matter tab 22 causes the top level of an outline 24 to appear as a bulleted list containing bulleted items 26. In addition, clicking the subject matter tabs 22 causes outline item tabs 28 to appear at the bottom of the media icon access panel 12. Each outline item tab 28 corresponds to one of the top level bulleted items 26 in the outline 24.

As shown in FIG. 2B, clicking on either the text of a bulleted item 26 or the corresponding outline item tab 28 at the bottom of the media icon access panel 12 will cause the next level of the outline to be displayed as a bulleted sublist 29. Clicking on a bulleted item in a sublist causes the next lower level of the outline to be displayed. In order to manage large outlines without excessive scrolling, the sections of the outline will expand and collapse so that only one item of each level of the outline is expanded at a rime. For example, FIG. 2B shows the "News" section of the outline has been expanded. Clicking on any bullet at the same level, such as the "Sports" bullet, would expand the outline to show the items in that bullet, but would also close the "News" section.

As shown in FIG. 2C, the lowest level of the outline is a list 36 of media icons 30. Each media icon 30 represents a media object. Each media icon includes a graphic icon 32 indicating the media type, such as audio, video, text, executable code, graphic, or unknown, of the media object. Each media icon also includes accompanying text 34 to briefly explain the content of the media object. When a cursor 42 moves over a media icon, the media icon is highlighted to indicate that it is selectable. Clicking on a media icon 30 does not open another level of the outline. Rather, as shown in FIG. 3A, holding the mouse select button down when a media icon is highlighted creates a copy 40 of the selected media icon, in a contrasting color. The user can drag the media icon copy 40 with the cursor 42. As shown in FIG. 3B, the media icon copy 40 can be dragged out of the media icon access panel 12 and dropped into the sequencer 14.

As shown in FIG. 4, the sequencer 14 includes a play list box 44, a play list button 46, and control buttons 48. When the copy of the media icon is dragged near the sequencer 14, it will snap into the play list box 44. By dragging media icons from the media icon access panel 12 into the sequencer 14, the user creates a sequence or play list 50 of media icons representing a playing order for the media objects associated with the media icons. Media objects can also be, added to the play list 50 by double-clicking on the media icon 30 in the outline 24. Each element in the play list 50 includes the copy 40 of the media icon, a checkbox 54, and a pop-up icon 56. The user may select one of the media icons 30 in the sequence by clicking on it to make it the current media icon 52. The current media icon 52 is highlighted in yellow and represents the media object that is playing, or that will play if a stopped player is started. If the number of elements in the play list 50 exceeds the vertical height of the play list box 44, a scroll bar may be created to scroll through the play list.

The user can modify the play list 50 to arrange the media objects into a desired playing order. For example, the user can change the order of media icons by dragging the media icon copy 40 inside the play list box 44. Clicking on a remove button 60 below play list box 44 deletes the current media icon, and clicking on a clear button 62 removes all media icons from the current play list 50. Unchecking the checkbox 54 to the left of the media icon copy 40 will cause that media object to be skipped when the play list is played. This permits the user to select a subset of a play list 50 to be played.

As shown in FIG. 5, additional information about each media object is accessible by clicking on the pop-up icon to generate a pop-up menu 58. This information will depend on the nature of the media object, and can be determined by the manager of the Internet site. For example, the pop-up menu can display information about image size, media type and frame rate.

As shown in FIG. 6A, the user can create and organize multiple play lists by use of the play list button 46. When the user clicks on the play list button 46, a pop up menu 70 appears with four options: Create, Delete, Rename, and Go To. The create option adds a play list, the delete and rename options remove and rename a play list respectively, and the Go To option switches to a different stored play list. As shown in FIG. 6B, each new play list creates an additional tab 72 at the top of the play list box. The new play list 50 may be populated by dragging media icons from the same or different branches of the outline 24. The user created play lists are similar in function to the favorites or book marks web browsers have for web pages. The pop-up menu 70 may also include a Play All option which causes every play list to be played. In addition, the pop-up menu 70 may include a Play Many option which allows the user to select a group of play lists, e.g., by selecting the play list tabs 72, and to play the media objects in the group. The functions of the play list button 46 could be accessed by other interactive features on the web page.

The pop-up menu 70 on the play list button 46 may also include a mail feature that permits users to select and exchange play lists. The mail feature may also be invoked by a separate button, or by dragging media icons from sequencer or media icon access area to a mailbox icon. The media objects in the mailbox may later be mailed one or several recipients.

As shown in FIG. 6C, when the addition of a new tab 72 causes a tab at the opposite end to "fall off" the play list box 44, a triangular corner marker 74 appears to indicate the direction in which there are more tabs to view. The user can click on the corner markers 74 to cause the tabs to shift left or right, as appropriate, to display the next play list tab.

As shown in FIG. 7, the object player 16 is used to play the currently selected media object from the play list 50 in the sequencer 14. The object player includes an image display window 80 and a control panel 82. The object player 16 can use any program that can be embedded in a web page that presents media objects. Examples of streaming media programs that can be embedded are QuickTime™, RealMedia™, and Microsoft Media Player™. Streaming media players, such as the illustrated RealMedia Player, include the control panel features, such as a stop button 100, a pause/play button 102, a previous button 104 and a next button 106. a vertical-slider control 108 provides audio volume control, and a horizontal slider control 110 provides fast forward/rewind control and indicates the amount of the stream that has been and remains to be played. A display panel 112 presents the current status of the media object, e.g., playing or paused, and a clock 114 shows the total duration of the multimedia object and the elapsed time.

The next button 106 works with the play list 50 in the sequencer 14 to cause the currently playing media object to stop and to cause the media object represented by the next checked media icon in the play list 50 to start playing. Similarly, the previous button 104 causes the currently playing media object to stop and causes the media object represented by the previous checked media icon in the play list 50 to start playing. When a new media object starts playing, it is highlighted in yellow as the current media icon. If there is no checked media icon in the play list before the current media icon, the previous button 104 is dimmed, and if there is no checked media icon is the play list after the current media icon, the next button 106 is dimmed.

The image display window 80 includes a handle 90, an image size lock button 92, a window shade button 94, and an image swap button 96. The image display window 80 has a home position in the upper left corner of the media access web page 10. However the user can reposition the image display window 80 by clicking on the handle 90 and dragging the image display window. When the image display window 80 is dragged out of its home position, it floats above the other areas of the web page 10 and the sequencer 14 expands to make use of the freed space to provide a larger play list box. On the other hand, if the image display window 80 is dragged back to its home positions, it will snap back to the home position and the sequencer 14 will shrink to its original size.

The user can click on the image size lock button 92 to set and release an image size lock that restricts the maximum size of the image display window 80. When the image size lock is released, the image display window 80 will resize to the default size of the particular media object. On the other hand, if the image size lock is set, the image display will not grow larger than the default size of the image display window 80. However, the first time in a session when an image that is larger than the image display window default size becomes current, a dialog box asks whether the user wishes the display to expand to the normal image dimensions required by the media object. If the user agrees, then the image lock is released and all images larger than, image display window default size will display full size. The size of the image display window 80 may also be set by dragging on the window edges.

Clicking on the window shade button 94 removes the image but leaves the handle 90. Clicking the window shade button 94 again restores the image. This is useful for quickly seeing what is beneath the image without repositioning it. The position swap button 96 changes the position of the image display window 80. When the image display is floating, clicking the position swap button 96 returns the image display to the home position. Clicking the position swap button 96 when the image window is in its home position returns it to is last floating position. The hide video button 98 hides the whole image display window 80, including the handle 90. For example, the image display window may be hidden to enlarge the sequencer 14 when working with audio-only media objects or if no video image is desired. The user redisplays image display window 80 by clicking the show video button below the sequencer 14. The image size lock, image shade, image swap buttons and hide video on the handle 90 of the image display window 80 are repeated below the sequencer 14 as a lock/unlock button 68, an open/close button 66, an away button 69, and a hide/show video button 64, respectively (see FIG. 4).

As shown in FIGS. 1 and 8A, the site-driven area 18 is a region of the web page 10 that is controlled primarily by the server in response to user actions. The contents of this synchronized display are not chosen by the user, but instead are determined by the Internet site application program. The Internet site can use the site-driven area 18 to present information, e.g., a rotating banner, associated with media objects that are playing. The contents of site-driven area 18 can also be based on user preferences, a user history, or a user profile. For example, when the media access web page 10 first loads, and if no media objects are playing, the site-driven area 18 can show a conventional "rotating" advertising banner 120. However, as shown in FIG. 8B, when a media object is playing, the site-driven area 18 shows a rotating banner 122 that is specific or "synchronized to the media object. For example, if the user plays a clip from a music video, an advertising banner for a CD from the same record label can be displayed in the site-driven area 18. Thus, the synchronized banner 122 provides information in parallel with the playing media object.

Each media object represented in the media icon access panel 12 can have none, one, or two or more synchronized banners 122. For example, one banner can reference a source (e.g., the web page where the media object was found) for the media object, and another banner can reference a sponsor (e.g., the company whose product is advertised) for the media object.

Each synchronized banner 122 can be associated with a playable media object. If a media object is associated with the banner 122, an indicator 130 appears in the frame of the banner 122. The indicator 130 can show the type of the media object (e.g., video, audio, etc.) with a graphical icon 102. The user can play the associated media object by dragging the banner 122 into the image display window 80 of the object player 16. In addition, the user can add the associated media object to the play list 50 by dragging the banner 122 into the play list box 44 of the sequencer 14.

As shown in FIG. 8C, dragging the banner 122 creates a copy 132, which acts as a media icon. When the dragged banner contacts the image display window 80, the image display border turns yellow to indicate it will play a new media object. Dragging the banner copy 132 into contact with the image display window 80 causes the object player to pause, and releasing a dragged banner copy 132 in contact with the image display stops the playing of the current object and starts playing the object associated with the banner. The highlight on the current media icon 52 in the play list 50 turns red to indicate that the play list is stopped. However, a media icon for the new media object is not added to a play list. Instead, once the media object associated with the banner is finished playing, the play list resumes playing with media object that was interrupted by dragging the banner.

As shown in FIGS. 9A and 9B, the site-driven area 18 can display information related to the associated banner or media object. This is indicated by a button or icon 134 appearing in the site-driven area 18. If the user clicks on the button 134, an expanded site-driven area 136 is opened. The expanded sponsor area may provide additional information (if any is available) details regarding the subject matter of the banner. For example, a more extensive advertising page may be presented.

The user can click on the media object indicator 130 on the banner 122 to open a pop-up menu 138. The pop-up menu functions are defined by the banner 122. Selecting "Play" can have the same effect as dragging the banner to the image display, i.e., the media object is played immediately. Selecting "Play Later" causes the media icon for the media object to be added to the end of the current play list 50. Other menu options may permit the user to visit the sponsor's web site or purchase products shown during presentation of the media object.

When the media access page loads, the sequencer 14 will be empty if the user has not visited the site before and if the site has not pre-loaded the sequencer 14 with any media icons. As the user loads the sequencer 14 with media icons, a record of the sequencer's contents is saved on the site server. This session state is preserved between visits, so that when the user returns to the site, the sequencer will contain the same content with which the user ended the previous session. In addition, the site managers have the option of selectively creating and preloading play lists and tabs for each user. Users can be notified about content which is no longer available and it can be removed from user play lists.

In addition, the user can create a personal preference profile that determines content to be preloaded into the sequencer 14. For example, while browsing through the outline 24 in the media icon access panel 12, the user may select an interface feature, e.g., a button, to indicate that the user is interested in receiving content related to the subject matter currently displayed in the outline. When the user returns to the site, the sequencer will be preloaded with media icons that fit the user's personal preferences. The user preference profile can be complex, and can be generated using the taxonomy of the outline. The result of the preload may be a topical set of play lists in the categories established by the user. Multiple interface methods can be used to generate the profile. An appropriate interface method may be selected depending on the nature of the content. The personal preferences selection method may be accessed by a top level tab of the media icon access panel 12, or otherwise may be a primary user interface.

The media icon access panel 12 may permit a user to view a history of the user's media object selections. For example, one of the tabs on the media icon access panel can display an outline of all play lists that have been created or all media objects that have been added to the sequencer. The outline may be organized by date, tab name, or current play list tab names. Thus, over time, the creation of play lists and play list tabs sequencer tabs gives the user the option to view a personalized access area, e.g., an outline 22 in the described implementation, on the media icon access panel 12.

The selection and playing of media objects is tracked, so that the user may later request previously played media objects, e.g., by date of selection or playing, or reconstituting play lists that have been deleted from her sequencer. Alternately, the user may apply a filter based on prior selections. For example, the user may elect to view only media objects that have not been played, or only media objects that were played last week. The user can create a personal preference that preload previously created play lists into the player.

Thus, users can interact with content that is pre-loaded in the sequencer (either by the site-manager or based on personal preferences), they can locate new media objects in the media icon access panel 12, organize the media objects into a play list 50 in the sequencer 14, exchange play lists with out users, and elect to review media objects that are offered in the sponsor area during the playing of each media object.

As shown in FIG. 10, a pageless Internet site 1000 for generating a media access web page includes server components 1002 and browser components 1004. Databases, including a content database 1010, an interface database 1012, and a user database 1014 are associated with the server 1002.

The content database 1010 contains information about the media objects that will be represented by media icons in the pageless Internet site. For example, the content database 1010 can include, for each item of content, the media type, i.e., video, audio, animation, and the like, a uniform resource code, a short text description, such as the title of the media object, the frame rate, duration and image size. The content database may also contain information about the origin of the media object, such as the author, copyright source name, source web site, sponsor name, and sponsor web site. If the media object represents an item that can be purchased, then the description and price of the item may also be stored in content database 1010. The content database may be updated periodically by the Internet site manager to provide new media objects to users, and to remove media objects that are no longer available.

The interface database 1012 contains the information required to support the generation of user interface elements in the media access web page. Specifically, the interface database 1012 includes tables that are used by queries to construct the outline 24 in the media icon access panel 12. The interface database 1012 includes a master outline reference table that contains one record for each method of constructing a level of the outline. Each record contains information 5 to define the format of the level and to construct queries in the client that will obtain the level below the level currently being displayed. One implementation of the master outline reference table includes the following fields

| | |
|---|---|
| Levelcode | a label for the outline level type |
| Levelcodenext | the label for the next lower outline level type |
| Querycode | a label for a structured query language (SQL) format query |
| Drag | determines whether the elements on the level are draggable |
| Color | determines the color of the elements on the level |
| Tab | determines whether the elements on the level should be repeated in tabs, e.g., bottom or side tabs 28 |
| Table 1-2 | names for up to two tables used in the query |
| Field 1-10 | names for up to ten fields used in the query |
| Sort | a sorting order for elements on the level |
| Adjcode | a name for the block of HTML display script |
| Writecode | determines whether the level writes, overwrites or adds to an existing level |

The user database 1014 maintains information about the content and the status of the play lists in the sequencer. For example, the user database 1014 may include the user's name, password and other personal information, as well as user profile and preference information that might be developed by the pageless Internet site manager. The user database 1014 can also contain a list of the play lists available to the sequencer 14, a list of the media objects in each play list 50, and identification of the currently selected play list and media object. The user database 1014 can also maintain a history of the use of the web page 10 by the user, e.g., by tracking the media objects put into the sequencer 14 and the order in which they are played by the player 16.

The server components of the pageless Internet site 1000 also include a web server 1020 and one or more media servers 1025. In brief, the web server 1020 receives queries from the client, passes the queries to the databases, receives the resulting recordsets from the databases, and delivers those recordsets back to the client. The media servers 1025 host the media objects and manage the serving of streaming media objects.

The web server 1020 serves the media access web page into a client 1030. a browser running on the client interprets the web page and displays it to the user. The web page contains the program that displays the interface controls, responds to user events, sends queries and updates to the web server 1020, receives and manipulates recordsets from the web server 1020, formats data for display, and controls the media player object. The web page also includes a number of data source objects (DSOs) 1034. In general, there are at least two independent database connections for the client. One connection is to the interface database that views the content database, and the other connection is to the user database and is bi-directional to the sequencer in support of user activity and history. Data in the data source objects can be bound to dynamic hypertext markup language (DHTML) objects so that changes in the DSO data result in updates to the client display. Specifically, the web page will include a sequencer DSO that is bound to the sequencer DHTML. The data source objects 1034 can pass query statements, e.g., in structured query language (SQL), to the web server 1020, and receive recordsets in return.

The DHTML for the media icon access panel 12 includes an array with an entry, e.g., a row, for each element in the outline 22 that is being displayed. Each entry contains all the information necessary to construct and format the outline element, and, if the element is a media icon, all the information about the media object, including type of the media object, the banners associated with the media object, the pop-up menus, and the media objects associated with the banners.

As shown in FIG. 11, when the media access web page is loaded, it checks for the existence of a cookie that can identify the user to the web server 1020 (step 1102). If a cookie is found, then the client queries user database 1014 in the server for the contents of the sequencer 14 at the end of the user's last session (step 1104). The server responds to this query and the sequencer DSO is loaded with the sequencer tab categories and play lists 50 (step 1106). In addition, media objects may be pre-loaded into the sequencer DSO based on an individual preference profile (step 1108). For example, a user may request to receive news updates, and this information would be stored in the user database 1014. Media objects added to the site since the user's last visit that fit the individual preference profile could be loaded into a "new" category on the sequencer tab. Next, site specific media objects may be pre-loaded into the sequencer DSO (step 1110). For example, tabs and play lists that the pageless Internet site manager wishes to be displayed when the user visits the site may be loaded. Next, the initial state of the access panel 12 is determined (step 1112). Specifically, a pre-defined initial query is sent by the client to the interface database 1012, and the interface database responds with a recordset that describes starting state of the access panel. The outline information and top tab names from this recordset are loaded into the access panel DSO. Finally, the site-driven area is activated to commence conventional banner rotation (step 1114).

If the user has not visited the site before and, consequently, no cookie is located, a new user is created in the user database 1014 (step 1120). The server generates a new user identification code (step 1122) and writes a cookie with the user identification code which is delivered to the client (step 1124). The application server 1020 then commences loading the site specific media objects into the sequencer DSO in step 1110.

FIG. 12 illustrates the steps performed by the pageless Internet site 1000 when the user is navigating through the outline in the access panel 12. In brief, clicking on a tab or outline line in the new media icon access panel 12 generates an SQL query of the interface database 1012 which returns a recordset containing the elements to be displayed and the format. As mentioned above, the interface database includes a record for each element in the outline (whether shown on media icon access panel 12 or not), and the array in the access panel DHTML includes an entry for each element 26 that is currently visible on the media icon access panel 12. Specifically, each entry in array contains the level of the element, the text associated with the element, the format for the element, and sufficient information to construct a query to obtain a recordset from the interface database for the level below the displayed element. If an element in the displayed outline 24 is clicked, a script is run which generates a query that is sent to the interface and content databases. The databases return a recordset that is stored in a temporary access panel DSO. The recordset is copied to the DHTML array, and the access panel DSO is cleared. Information from the DHTML array is used to write, add or overwrite DHTML to a DHTML span which describes a display region on the media icon access panel. Since the formatting information is taken from the interface database, the media icon access panel 12 can be transformed without reloading any page or frames.

If the user clicks on a tab 22 or an outline line 26 (rather than a media icon 30), the outline is collapsed so that other outline elements at the same level are closed (step 1202). A wait message, e.g., "retrieving element," may be displayed to the user (step 1204) while the client retrieves the SQL query data from client memory (step 1206), generates an SQL query that is sent to the application server 1020 (step 1208) and receives a resulting recordset which is copied to a DHTML array (step 1210). The new outline is formatted and displayed (step 1212).

If the user clicks on a media icon 30, the media icon is copied to a DHTML layer that represents the top layer to be displayed by the client (step 1220). The color of the media icon is changed to a "dragging" color. The client then detects whether the media icon has been dragged to the sequencer (step 1222). If the mouse button is released before the media icon overlaps the sequencer 14, then the copied media icon is removed from the drag layer and disappears (step 1224). On the other hand, if the mouse button is released when the media icon overlaps the sequencer 14, then the record associated with the media icon is copied horn the access panel array to a JavaScript array and appended to the sequencer DSO (step 1226). Thus, all the information for the media object associated with the media icon, including the media object's pop-up menu, associated banners, and banner pop-up menus is copied from the access area array to the sequencer DSO when a user adds a media object to a play list. Since the play list 50 is data-bound to the sequencer DSO, updating the recordset of the sequencer DSO adds a media icon to the bottom of the play list 50. Then the sequencer DSO updates the user database 1014 (step 1228).

As shown in FIG. 13A, when the user clicks a new sequencer tab 72 (step 1300), the sequencer DSO submits changes in the current tab play list to the user database 1012. This change also resets the source for the object player (step 1304). Thus, the object player is ready to play the first checked object in the new play list 50. The play list for the new tab is filtered and loaded from the sequencer DSO recordset. Because the play list 50 is bound to the sequencer DSO, it shows the media objects associated with a new tab.

If the user clicks on the remove button 60, the selected media objects record is deleted from the sequencer DSO, and the corresponding bound DHTML object is updated accordingly. Similarly, if the user clicks on the clear button 62, all media objects records from the current tab assignment are deleted from the sequencer DSO, thereby updating the corresponding bound DHTML play list. In both cases, the sequencer DSO submits changes in the play list to the user database 1014.

As shown in FIG. 13B, changes to the sequencer tabs using the create, delete or rename functions in the pop-up play list menu 70 cause changes in the corresponding records in the sequencer DSO. The DHTML objects bound to the tab sequencer DSO are also rewritten to update the visual appearance. In addition, the tab sequencer DSO submits the changes to the user database 1014.

As shown in FIG. 13C, the JavaScript embedded in the web page 10 includes a tab display manager 1350 that is activated when the user clicks a left tab button, a right tab button, creates or edits a tab, or when the user database is first loaded into the sequencer DSO. The tab manager 1350 stores variables representing the first and last visible tabs. The tab manager 1350 adds the left or right tab corner marker buttons 74 to the left or rightmost tabs when there are more tabs available to the left and/or right. For example, assuming the user has clicked the tab-left button, the variable representing the first tab is decremented by one (step 1352). Then the variable representing the last tab is set by setting it equal to the first tab and incrementing it until either the last tab is reached or no more tabs fit on the access. The tab display manager can calculate whether tabs fit on the play list box by storing the horizontal length of the play list box 44 and the horizontal length of each tab 72. The visible tabs are positioned (step 1356) and the tab left and tab right buttons are reset depending on whether there are additional tabs to the left or right. Similarly, if the user clicks a right tab button, then the variable representing the last tab is incremented by one (step 1362) and the variable representing the first tab is determined by setting it equal to the last tab and decrementing it until either the first tab is reached or no more tabs fit on the playlist (step 1364). Then the visible tabs are positioned (step 1366) and the left and right tab buttons are reset (step 1358).

As shown in FIG. 14, when a user plays a media object from the play list 50, e.g., by pressing play button 85 (step 1400), a JavaScript function is triggered which generates a user interface command that is sent to the media player object 1036. In response, the media player object 1036 signals the appropriate media server 1025, which retrieves a media stream from the source specified in the media icon record (step 1402). Rotation of the default banner stops (step 1404), and the sponsor's URL is retrieved from the sequencer. DSO (step 1406). In addition, the specific banner associated with the media object, e.g., a sponsor banner or a source banner, is displayed in the site-driven area 18 (step 1410). Once the object player begins buffering the media stream, the media type and image size are determined from the media icon data source object (step 1412). If the media object image size is greater than the image display window default size, then the user is asked if he or she wishes to expand the image display (step 1414). If the user agrees, or if the image size is smaller than the image display window default size, then the image display is resized to fit the actual image size of the media object (step 1416). Otherwise, the image display is left at the image display window default size (step 1418). Next, if the image display is located at the home position (as determined in step 1420) then it is centered (step 1422). Otherwise, the image display is not moved (step 1424).

Once the object player buffers the media stream, the media object starts playing (step 1430). When this occurs, the checkbox 54 associated with the media object is unchecked by changing the corresponding check field in the sequencer DSO (step 1432). Changing the sequencer DSO causes the bound DHTML checkbox to be unchecked (step 1434). When play ends (step 1440), the sequencer finds the next checked checkbox in the play list 50 (step 1442). The media icon associated with this media object is highlighted (step 1444), the URL of the new media object is loaded (step 1446) and the new media object is played (step 1448) thereby returning to step 1402. If the sequencer cannot locate another checked checkbox in the play list 50, the object player stops (step 1450) and the site-driven area 18 returns to default banner rotation (step 1452).

As shown in FIG. 15, if the user clicks on the banner 122, a copy of the banner is moved into the top layer DHTML so that the banner can be dragged (step 1502). If the last button is released when the banner is touching the image display 80 (as determined in step 1504) or if the banner is touching the sequencer play list box 44 (as determined in step 1506), the URL of the media object associated with the banner is retrieved from the sequencer DSO current record (step 1508). If the mouse is released elsewhere, then the banner will disappear (step 15 10). If the 20 banner was moved to contact the sequencer, a new record is created in the sequencer DSO (step 1520). Identification codes for the user and tabs are copied into the new record (step 1522) and the banner media object data is also copied into the new record (step 1524); Finally, the DHTML play list table is updated with the new sequencer DSO record (step 1526).

On the other hand, if the banner is moved to contact the image display window 80, then the object player 16 is paused (step 1530). If the banner is moved away from the image display window 80 without releasing the mouse button (as determined in step 1532), then the object player 16 resumes playing (step 1534) and the banner may continue to be dragged around the screen. However, if the mouse button is released when the banner is touching the image display, then the current media icon 52 in the play List 50 is highlighted in red to indicate that it has been interrupted (step 1540), and the media object associated with the banner is played (step 1542). When the media object associated with the banner has stopped playing, the current media icon 52 is changed back to a yellow highlighting (step 1544) and play is restarted (step 1546).

As shown in FIG. 16, when the user clicks on indicator 130 (step 1600) or button 56, a sponsor or source pop-up string is retrieved from the sequencer DSO current record (step 1602). The string is an encoded "menu description notation" (MDN) string that describes the hierarchy of menu items, the appearance of the menu and the programmed behavior for the menu items. Specifically, the string is an ordered sequence of delimited fields. The MDN string is an economical means to transport the instructions for building and defining the content of pop-up menus from the sever to the client or between client feature datastores. Each menu item includes the following fields:

| | |
|---|---|
| Caption | The text to be written in the menu item |
| Command | a code representing a predefined command to be executed by the web page |
| Parameter | Parameters for the command. Multiple parameters may be delimited by a tilde character "-". |
| Trigger | Identifies the type of mouse event that triggers the command, such as "Rollover" or "Click" |
| Status | Indicates how a menu items should be displayed if the command is not available, e.g., dimmed, grey text, or removed. |
| Image | The URL for a graphic to appear in the menu item |
| Separator | A horizontal relief line. |

Each field may be delimited by a character, such as the "caret" character "^", and menu items may be delimited by a "bar" character "|". In addition, two control characters are used to define the hierarchical relationship between the menu items. Specifically, one control character, e.g., a "greater-than" character ">", indicates a step to a super-menu of the current menu item, whereas the other control character, e.g., a "less-than" character "<", indicates a step to a submenu of the current menu item. The MDN handles null data fields and truncated strings by assuming a default behavior.

For example, the pop-up menu 56 shown in FIG. 17 may be generated by the following MDN string:

<|Preview^^^D^^|<|View^P^http://205.180.55.240/dataplus/foxsearchlight5 23/server/docs/filmstrips/realmedia/1024/63.jpg~^^R^^|>|Description^|<| Read^D~^^|>R^|^^^^^true^|Info^^^D^^|<|Title^^^|D<|EdBurns^^^N6R^^|>|

-continued

```
Author    D  |<|FoxSearchlight  N R  |>|Copyright   D  |<|  N R  |>|
Modify Date    D  |<|6/19/97 9:30:50 AM   N R  |>|Details    D  |<|
Image Size    D  |<|112 Height x 160 Width   N R  |>|Media Type    D  |<|
Video   N D  |>|FrameRate    D  |<|10 fps   N R  |>|Duration    D  |<|
20    N R|>|>|>|Source    D  |<|Name    D  |<|Fox Searchlight Pictures   N R  |>|
URL    D  |<|www.foxsearchlight.com    R  |<|Open UA http://www.foxsearch
Light.com//index.htm-  R  |>|>|>|Sponsor |<|Name    D  |<|Intel   N R  |>|
URL    D  |<|intel.com    R  |<|Open U override- N D  |>|>|Play V ~ N D  |>|
Buy   D  |<|Tape   D  |<|$14.95    D  |<|PurchaseNow B override~ N R  |>|
>|DVD   D  |<|    R|<|  N %  |>|>|Stream   D  |<|$.50    R  |<|PurchaseNow B override~ N R  |
```

When the MDN string has been retrieved from the sequencer DSO, a message can be displayed to the user indicating that the pop-up menu is being built (step 1604). The MDN string is passed to a pop-up engine (step 1606). The pop-up engine constructs a multidimensional array. This array can be interpreted by a pop-up menu builder to construct an HTML pop-up array. The pop-up engine parses each string section (step 1610) by searching for the menu item delimiter. If the delimited string contains a down-control character, the pop-up engine tests for the existence of a lower menu level (step 1614). If the lower menu already exits, then it is selected (step 1616). Otherwise a new menu level is built (step 1618). Similarly, if the up control character is found, then a pop-up engine tests for existence of a higher menu level (step 1624). If the higher menu level already exists, then that menu level is selected (step 1626). Otherwise, a new menu level is built (step 1628). If the delimited string contains neither an up nor a down control character, then the data in the string is parsed (step 1632). When the pop-up engine has reached the end of the string (step 1634), the array is passed to the pop-up menu builder which constructs an HTML menu from the array and writes the new HTML to the document.

When the mail feature is activated, the user's ID and an identification of the currently selected play list are written to an electronic mail table record in the user database. A window is opened to present a standard ASP form to receive information about the recipient, e.g., the recipient's electronic mail address. When the electronic mail is sent, the fields from the ASP form are inserted into the electronic mail table record, the body of the electronic mail is written, and the mail is formatted with a New Mail Active Messaging Component and passed to an NT SMTP service. The NT SMTP service connects to a remote domain mail server account, and passes the outbound mail for delivery. When the recipient selects the delivered electronic mail, the displayed text will include a button linking to a mail query ASP form on the server. When the button is selected, a browser is launched and connects to the server. The server determines the browser configuration to see if it is capable of playing the media objects in the play list and capable of creating and operating a sequential player. If the browser is capable of playing the media objects, an HTML page is assembled appropriate to the browser configuration to display the media icons from the mailed play list. However, the server may be configured to return a play list that includes only the currently valid media objects so that when the recipient chooses to play the media objects, bad links will be avoided. The electronic mail recipient may then play the media objects.

The invention has been described in terms of a particular embodiment. Other embodiments are within the scope of the following claims. For example, although the application has discussed web pages that are accessed though the Internet, the invention is generally applicable to other client-server arrangements, such as an Intranet, where the client runs a viewer program and the server delivers an electronic document the client.

What is claimed:

1. A computer-readable storage device comprising executable instructions that, in response to execution, cause a server device to perform operations, comprising:
   in response to detecting, by the server device, a cookie on a remote device, initiating a query to a data store associated with the server device based on information from the cookie to obtain play list data for a sequencer of a media player, wherein the play list data defines an order in which one or more media objects are played by the media player;
   causing the remote device to display, in a sequence area of a display of the remote device, a set of media objects, wherein the set of media objects are defined by the play list;
   in response to detecting that a media icon has been dragged from a media icon access area of a display of the remote device to the sequencer area of the display, appending a media object, retrieved from the data store and corresponding to the media icon, to the play list data to yield updated play list data; and
   updating an interface of the media player on the display based on the updated play list data.

2. The computer-readable storage device of claim 1, wherein the operations further comprise establishing a connection to an interface data store, wherein the interface data store comprises a master outline reference table.

3. The computer-readable storage device of claim 1, wherein the query is a first query, and the operations further comprise:
   in response to detecting a selection of a category object via interaction with the media player, initiating a second query to the data store for a set of media objects corresponding to a media category represented by the category object, wherein the set of media objects have been determined to satisfy a criterion defined in a preference profile; and
   updating the interface of the media player based on a result set received in response to the second query.

4. The computer-readable storage device of claim 3, wherein the detecting the selection comprises detecting a tab being selected on the media icon access area.

5. The computer-readable storage device of claim 4, wherein the updating comprises displaying, via the interface of the media player, a subset of the play list data corresponding to the tab.

6. The computer-readable storage device of claim 3, wherein the initiating the second query comprises selecting, via the media icon access area, an element of an array comprising the media object.

7. The computer-readable storage device of claim 1, wherein the operations further comprise, in response to detecting a selection of a previously unselected media object, receiving a result set corresponding to the previously unselected media object.

8. The computer-readable storage device of claim 1, wherein the operations further comprise obtaining the play list data according to a state corresponding to a most recent session of the media player.

9. The computer-readable storage device of claim 1, wherein the operations further comprise initiating a displaying of advertising content in an area of the display of the remote device.

10. A method, comprising:
in response to detecting, by a server device, a cookie being stored on a remote computing device,
querying a data store associated with the server device for play list data, wherein the play list data defines an order in which one or more media objects are played, and
instructing the remote computing device to load a player object based on the play list data and initiating a displaying, to be performed by the remote device, of a set of media objects defined by the play list data; and
in response to determining that an icon associated with a media object stored in the data store has been dragged from a media icon access area displayed by the remote computing device to the player object,
appending a record associated with the media object to the play list data to yield updated play list data; and
updating the player object in accordance with the updated play list data.

11. The method of claim 10, further comprising displaying advertising content on an area of the player object.

12. The method of claim 10, further comprising, in response to detecting a selection of a category object of the player object resulting from an interaction with the player object:
querying another data store of the server device for a set of media objects corresponding to a media category represented by the category object, wherein the set of the media objects have been determined to satisfy a criterion defined in a preference profile,
receiving a result set in response to the querying the other data store, and
updating the play list data based on the result set.

13. The method of claim 12, wherein the detecting the selection comprises detecting a selection of a tab or an outline line of the player object.

14. The method of claim 12, further comprising storing the result set in a temporary access panel object.

15. The method of claim 14, further comprising copying the result set to a dynamic hypertext markup language array.

16. The method of claim 10, further comprising:
in response to the querying of the data store, receiving the play list data as the play list data existed at an end of a most recent session of the media player.

17. A server system, comprising:
a memory communicatively coupled to a processor, the memory having stored thereon computer-executable instructions executable by the server system to perform operations, comprising:
in response to detection, by the server system, of a cookie on a remote device, sending a first query to a data store of the server system, wherein the data store stores play list data defining an order in which one or more media objects are played by a media player, and wherein the first query comprises information from the cookie;
receiving a subset of the play list data from the data store in response to the first query;
instructing the remote device to display a set of media objects defined by the play list data;
in response to a determination that a media object icon corresponding to a media object has been dragged from a media icon access area of the remote device to the media player, sending a second query to the data store requesting the media object; and
updating the subset of the play list data based on the media object received in response to the second query.

18. The system of claim 17, wherein the operations further comprise sending a third query to an interface data store in response to detection of a selection of a tab of the media icon access area, wherein the interface data store contains one or more data structures for constructing an outline of subjects in which media objects, including the media objects, are arranged.

19. The system of claim 17, wherein the play list data defines an order to render media objects by the media player.

20. The system of claim 17, wherein the operations further comprise:
in response to detection of a selection of a category object of the media player via interaction with an interface associated with the media player, sending a third query to the data store requesting a set of media objects that correspond to a media category represented by the category tab and have been determined to satisfy a criterion defined in a preference profile; and
updating the subset of the play list data based on a result set received in response to the third query.

* * * * *